(12) United States Patent
Sakamoto et al.

(10) Patent No.: US 7,083,107 B2
(45) Date of Patent: Aug. 1, 2006

(54) MEMORY CARD

(75) Inventors: Shizuka Sakamoto, Hiroshima (JP); Noriko Sugimoto, Hyogo (JP); Masahiro Kawasaki, Hiroshima (JP); Eiji Ueda, Hiroshima (JP)

(73) Assignee: Matsushita Electric industrial Co., Ltd., Osaka (JP)

( * ) Notice: Subject to any disclaimer, the term of this patent is extended or adjusted under 35 U.S.C. 154(b) by 171 days.

(21) Appl. No.: 10/671,493

(22) Filed: Sep. 29, 2003

(65) Prior Publication Data

US 2004/0060988 A1    Apr. 1, 2004

(30) Foreign Application Priority Data

Sep. 30, 2002  (JP) .............................. 2002-285924

(51) Int. Cl.
*G06K 19/06*    (2006.01)

(52) U.S. Cl. ...................... 235/492; 235/375; 235/382; 235/487; 361/737

(58) Field of Classification Search ................ 235/492, 235/493, 441, 488; 455/588; 361/737
See application file for complete search history.

(56) References Cited

U.S. PATENT DOCUMENTS

| | | | | |
|---|---|---|---|---|
| 5,770,846 | A * | 6/1998 | Mos et al. ................... | 235/440 |
| 6,768,645 | B1 * | 7/2004 | Kadonaga .................... | 361/737 |
| 6,834,810 | B1 * | 12/2004 | Maruyama ................... | 235/492 |
| 6,865,086 | B1 * | 3/2005 | Gochnour et al. .......... | 361/737 |
| 6,895,255 | B1 * | 5/2005 | Bridgelall ................. | 455/552.1 |
| 2001/0006902 | A1 * | 7/2001 | Ito .............................. | 455/558 |

FOREIGN PATENT DOCUMENTS

JP          2-214354         8/1990

* cited by examiner

*Primary Examiner*—Seung H Lee
(74) *Attorney, Agent, or Firm*—McDermott Will & Emery LLP

(57) ABSTRACT

A memory card that makes it possible to select the service provided by changing an adapter instead of having selection switches on the outer appearance of the card. The memory card is capable of executing one of a plurality of applications that correspond to individual services and comprises: an adapter that designates one of the services; a main card body to which the adapter is removably connected; an interface for an external device; a memory unit that stores information of the plurality of applications; a detection unit that detects whether or not an adapter is connected to the main card body; and a CPU or LSI that executes the selected application based on the detection signal to provide the service to the external device.

11 Claims, 23 Drawing Sheets

MEMORY CARD

BACKGROUND OF THE INVENTION

1. Field of the Invention

This invention relates to a memory card that has at least a CPU or LSI and a semiconductor memory, and that is capable of providing a plurality of services on one card.

2. Description of the Related Art

Recently, compact and lightweight IC cards having a built-in semiconductor memory are widely used. One well-known example is the IC card whose main body is the size of a stamp, as shown on the left side in FIG. 23A.

The IC card that is shown on the left side of FIG. 23A has contacts 32 near the edge on one end on the underneath side of the main body 31 of the IC card, which has a built-in semiconductor memory or the like, and these contacts 32 electrically connect the semiconductor memory or the like with an external device; and a slanted cut out part 33 is formed on one of the corners of the flat main body of the IC card 31, and this cut-out part 33 has an identification function in order to prevent inserting the IC card in the wrong way. Moreover, a concave part 34 is formed on one side of the card body 31 in order firmly hold the IC card when inserted into an external device, and a concave part 35 is formed on the other side in order to allow the write-enable/disable switch 36, which sets whether data can or cannot be written to the semiconductor memory, to freely slide. It is possible to set whether or not to allow data to be written to the semiconductor memory according to the sliding position of the write-enable/disable switch 36.

Here, a multi-purpose IC card that is capable of providing a plurality of services on one card is proposed as the IC card. For example, this is possible by using JavaCard (R), which executes Java (R) processing for IC card and which is advocated by Sun Microsystems, USA.

The multi-purpose IC cards can be used for cards such as credit cards, cash cards, commuter passes, medical-examination cards, insurance card, electronic money, etc. By inserting a multi-purpose IC card into a card holder that is connected to a personal computer, and connecting to the Internet, not only could the card be used to purchase a concert ticket, but that concert ticket itself could be electronically stored on that card, and the multi-purpose card could be used as an electronic ticket at the concert hall.

Even in the case of just a credit function, it is possible to utilize the services from a plurality of credit-service companies with just a single card. The stamp-sized card that is shown on the left side of FIG. 23A can be also used as the multi-purpose IC card. In the explanation below, the IC card is a multi-purpose IC card, so, the multi-purpose IC card will be simply called an IC card unless stated otherwise.

On the other hand, it is desired to make the IC card even more compact. In many cases, the use of IC cards is in portable contacts. For example, in the case of use in a mobile telephone, even stamp-sized IC cards can be considered large.

Therefore, as shown on the right side of the FIG. 23A, an IC card that is half the size of the stamp-sized card is considered. In this case, the size of the main card body 37 is made half the size as shown in FIG. 23A, and the rest of the construction is left the same. FIG. 23B shows the shape of the side surface of the IC card shown in FIG. 23A.

Therefore, as shown on the right side of the FIG. 23A, an IC card that is half the size of the stamp-sized card is considered. In this case, the size of the card body 37 is made half the size as shown in FIG. 23A, and the rest of the construction is left the same. FIG. 23B shows the shape of the side surface of the IC card shown in FIG. 23A.

However, in the example shown on the right side of FIG. 23A and FIG. 23B, when the length (or width) of the IC card is reduced, there is a possibility that it could be swallowed accidentally by an infant. Moreover, even when there is electrical compatibility with the stamp-sized IC card (left side of FIG. 23A), the shape is different, so when the card is inserted by mistake into a connector of an external device for a stamp-sized IC card, there is a possibility that the IC card could get stuck inside the connector and not be able to be extracted from the device, or there is a possibility that the it will fall inside the external device through a gap in the connector.

Therefore, when using an IC card that is half the size of a stamp-sized IC card in a device for a stamp-sized IC card, it is necessary to use an adapter or the like that will make the shape fit the shape of a stamp-sized IC card.

Also, in the case of the IC card shown in FIGS. 23A and 23B, there are IC cards that have a write-enable/disable switch as described above, however there have been no IC cards that have a switch for selecting which of the services from the IC card to provide.

Therefore, a card having a switch for selecting the service to be provided has been disclosed (for example, Japanese patent unexamined publication No. H2-214354).

However, in the case of the card described in the aforementioned disclosure, the switch for selecting the service to be provided is located on the main card body so there is a possibility that someone other than the owner of the card could accidentally use a service. In the case of providing services where highly secure personal information is used, such as for credit cards, cash cards, commuter passes, medical-examination cards, insurance cards, electronic money, etc., accidental use of a service by someone other than the owner of the card is a problem.

Also, since that memory card is compact, even when several services are provided, placing a plurality of switches on the surface of the card for switching and selecting a service is limited. Moreover, when a CPU or LSI is installed on the memory card and the card is made the same size, the amount of space for placing a plurality of selection switches is even limited.

The same is true for stamp-sized IC cards or cards that are even half that size, as shown in FIGS. 23A and 23B, in which a CPU or LSI is built into the semiconductor memory, placing a plurality of selection switches on the card is limited.

Moreover, even though the IC card is capable of providing a plurality of services on a single card, it may not be possible to determine which services are currently provided by simply looking at the outside of the IC card. Also, when that IC card is inserted into a cardholder, determining the services provided becomes even more difficult.

SUMMARY OF THE INVENTION

An object of this invention is to provide an IC card that is capable of providing a plurality of services on one card, and where the service to be provided can be selected by changing an adapter instead of placing selection switches on the outer surface of the card.

Another object of this invention is to provide an IC card for which it is possible to determine by looking at just the outside of the card a service provided or being provided by the card.

In order to accomplish the objectives mentioned above, this invention is an IC card that is capable of executing one of a plurality of applications corresponding to individual services, and provides a memory card comprising the means described below.

In this memory card, information of the plurality of applications is stored in a memory unit. The main body of this memory card is capable of being removably connected to an adapter. The adapter is prepared such that it corresponds to a provided service, and in order to arbitrarily switch among a plurality of services, a prepared adapter is connected to the main card body. A detection unit detects whether or not an adapter is connected to the main card body. And, the CPU or LSI executes the application that corresponds to a selected service according the detection signal from the detection unit. Thereby, the selected service is provided to an external device by way of an interface.

It is preferred that the adapter be shaped to correspond to the service provided. In order to make it easy to identify the service provided, the external appearance of the adapter differs according to the service.

It is also possible to have a unit in the adapter for storing all kinds of information, and for the CPU or LSI to use that information for managing the service provided. For example, a service ID that uniquely identifies the service is stored in the adapter and memory unit of the main card body. The CPU or LSI acquires the service IDs from both the adapter and memory unit, and compares both IDs. As a result, when both IDs match, selection of the service by the adapter becomes effective, and the selected service is provided to an external device.

Moreover, it is possible to store a device ID in the adapter and external device that uniquely identifies the external device. In that case, the CPU or LSI acquires the device IDs from the adapter and external device and compares them. As a result, when both IDs match, the service is provided to the external device.

Furthermore, it is possible to store a card ID in the adapter and memory unit of the main card body that uniquely identifies the memory card. In that case, the CPU or LSI obtains the card IDs from the adapter and memory unit and compares them. As a result, when both IDs match, the service is provided to the external device.

Also, it is possible place an IC tag in the adapter that sends information of the service by contact or contact-less communication. This IC tag can be used to send information about the selected service according to information supplied from the main card body.

In the main card body, a unit can be provided that detects whether or not an external device is connected. It is possible to control the sending of information of the service from the IC tag by having a control unit in the adapter that stops the sending of information of the service from the IC tag when it is detected that the main card body is connected to the external device.

It is also possible to have the CPU or LSI receive a detection signal from a detection unit for a specified length of time interval after the main card body has been connected to an external device. The specified length of time interval referred to here includes the instant that the main card body is connected to the external device.

In order to notify the CPU or LSI whether or not the main card body is connected to an adapter, it is also possible to have concave or convex shaped adapter-connection contacts on the adapter, and to have convex or concave main-body-connection contacts on the main card body that fit with the concave or convex adapter-connection contacts. In this case, the detection unit sends a notification signal to the CPU or LSI by closing the contact points between the adapter-connection-contacts and main-body-connection contacts when an adapter is connected to the main card body.

Also, in order to securely maintain the connection between the adapter and the main card body, it is possible to form small protrusions or small holes on the sides of the adapter-connection contacts and to form small holes or small protrusions on the main-card-body-connection contacts such that they fit together.

It is possible for the adapter-connection contacts to be convex shaped and for the number of contacts to be no more than the number of concave shaped main-card-body-connection contacts. In this case, the number of adapter-connection contacts and service information corresponding to the number or the position of the contacts, or a combination of the number and position of the contacts is stored in the memory unit.

Furthermore, it is possible for the number of adapter-connection contacts be one or two or more and to be a combination of contacts having the contact points and contacts not having the contact points. In this case, service information corresponding to the combination of adapter-connection contacts having and not having the contact points is stored in the memory unit.

In this invention, a service is provided to an external device only when an adapter is connected to the main card body, so when providing a service there is no particular need to have selection switches on the outer surface of the main card body. In other words, the adapter itself serves the function of a switch for providing a service.

Also, when the shape of the adapter is such that it corresponds to a service to be provided, it is possible to recognize what service is to be provided or what service is already being provided by a simple glance.

Moreover, by providing a selected service to an external device when service IDs that are acquired from both the main card body and the adapter match, it is possible to prevent the use of a fake adapter or prevent the service from being improperly provided even when the main card body is lost.

Furthermore, by providing a selected service to an external device when device IDs that are acquired from both the external device and adapter match, it is possible to prevent improper use of the card by a third party even when the card with an adapter connected to the main body is lost.

Also, by providing a selected service to an external device when card IDs that are acquired from both the main card body and adapter match, it is possible to prevent improper use of an adapter even when the adapter is lost.

Also, by using an IC tag with the adapter, it is possible for the user to easily check service information.

Moreover, by stopping service information while the main card body is connected to an external device, it is possible to avoid information from leaking unnecessarily.

Furthermore, by having the CPU or LSI receive a detection signal from the detection unit for just a specified amount of time interval after the main card body has been connected to the external device, it is not possible for the service to be changed after the main card body that is connected to an adapter has once been connected to an external device even when for some reason the adapter is removed from the main card body.

Particularly, by making the connection between the adapter and main card body be such that concave-shaped adapter-connection contacts fit with convex-shaped main-body-connection contacts, or conversely, such that convex-shaped adapter-connection contacts fit with concave-shaped main-body-connection contacts, it is possible to prevent the two from easily coming apart, and make connection easy to perform. Also, it is possible to easily and instantly determine whether or not the adapter-connection contacts are connected with the main-body-connection contacts by closing the contact points between the adapter-connection contacts and main-body-connection contacts and electrically sending a conduction signal.

Moreover, by forming small protrusions or small holes on the side surfaces of the adapter-connection contacts and forming the main-body-connection contacts such that they fit with those small protrusions or small holes, for example, in the case where small protrusions are formed on the side surfaces of the adapter-connection contacts, small holes that correspond to those protrusions are formed on the main-body-connection contacts, or, in the case where small holes are formed on the side surfaces of the adapter-connection contacts, small protrusions that correspond to those holes are formed on the main-body connection contacts, and in doing so the fit between the adapter and main card body when connected is improved. Therefore, it is possible to even better prevent the adapter and card from coming apart.

Furthermore, by making the shape of the connection section of the adapter that connects to the main card body different according to the service provided, for example, by making the number of convex-shaped adapter-connection contacts no more than the number of concave-shaped main-body-connection contacts, and by providing services corresponding to the number, position or both of the number and position of the adapter-connection contacts, or by providing different services according to the combination of adapter-connection contacts having and not having the contact points, there is no need to have a plurality of service-selection switches on the outer surface of the main card body.

BRIEF DESCRIPTION OF THE DRAWINGS

FIG. 23B is a side view of the IC card shown on the right side of FIG. 23A.

DESCRIPTION OF THE PREFERRED EMBODIMENTS

The preferred embodiments of the invention will be explained with reference to the drawings. In each of the embodiments the memory card of the invention is embodied as an IC card.

First Embodiment

The IC card 1 of a first embodiment of the invention will be explained with reference to FIGS. 1 through 5. This IC card 1 is an IC card capable of providing a plurality of services on one card, and has a built-in memory unit M (not particularly limited, however can be a semiconductor memory, for example), and a CPU 100 (this can also be an LSI) that performs overall control of the IC card 1, reads information from the memory unit M and provides a selected service to an external device (not shown in the figure). The plurality of services referred to here are obtaining functions such as that of a credit card, cash card, commuter pass, medical-examination card, insurance card, electronic money and the like.

Figure 1:
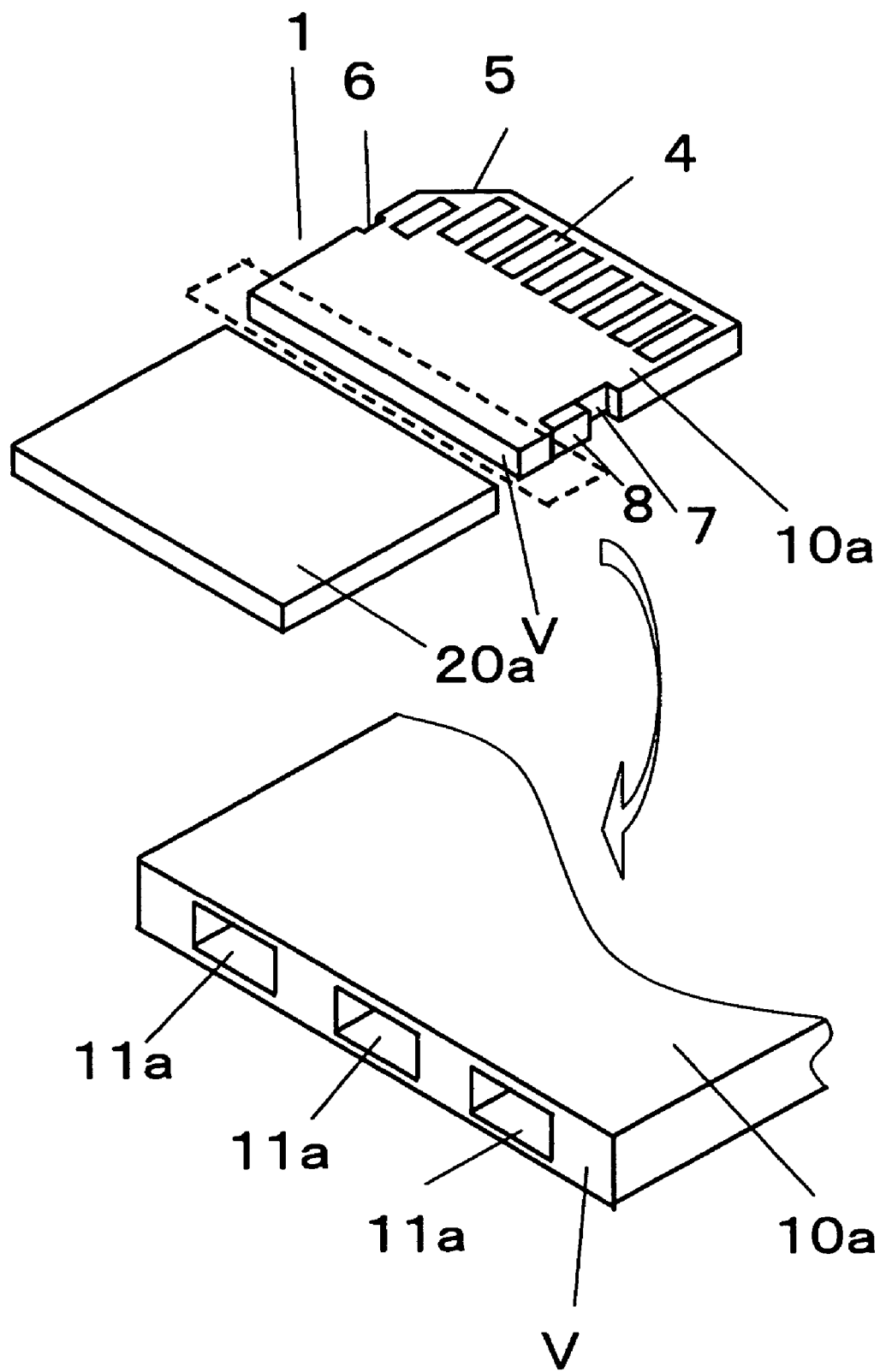
FIG. 1 is an oblique drawing of the main parts of the main card body of an IC card of a first embodiment of the invention.
Figure 23A:
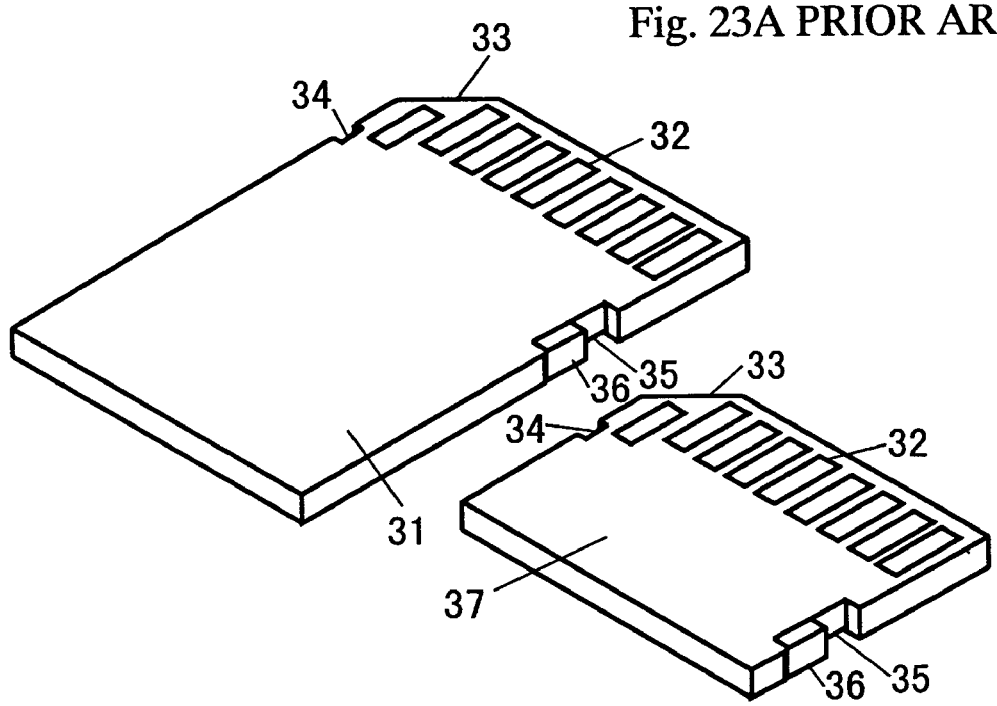
FIGS. 23A and 23B are drawings of a prior IC card, where the left side of FIG. 23A is an oblique drawing showing a prior stamp-sized IC card, and the right side of FIG. 23A is an oblique drawing of an IC card that is half the size of that shown on the left side.
Figure 23B:
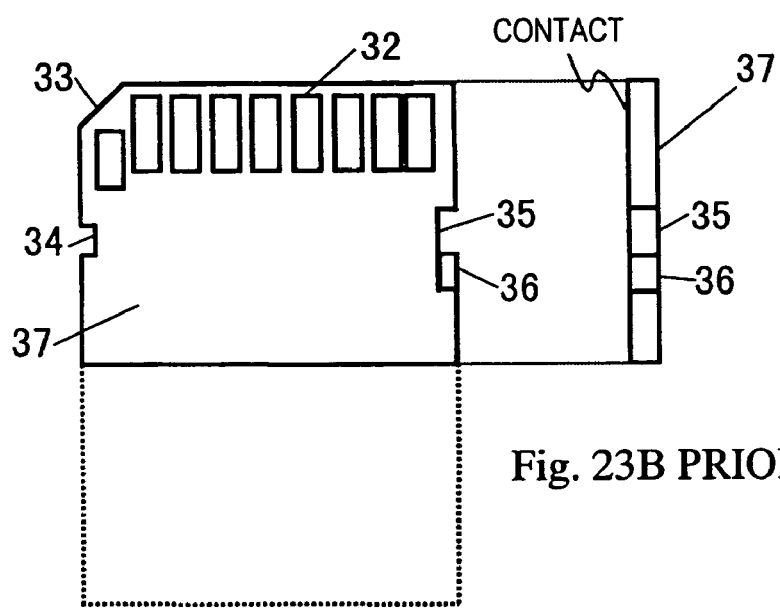

As shown in FIG. 1, this IC card comprises a main card body 10a and adapter 20a, where the adapter 20a is connected to the main card body 10a such that it can be freely attached or removed. The size of the IC card when the adapter 20a is connected to the main card body 10a is that of a stamp, and the outer appearance is similar to that of the IC card shown on the left side of FIG. 23A. The size of the main card body 10a is about half the size of a stamp, and is similar to the IC card shown on the right side of FIG. 23A. By keeping the size of the external planar shape fixed (stamp sized) in this way, it is possible to provide a card having a small volume, and it can be used in devices that are compatible to specific IC cards having a fixed external planar shape size (stamp sized).

Near one edge on one surface of the main card body 10a there is a memory unit M and contacts 4 for electrically connecting the CPU 100 with an external device, and on one corner of the planar shape of the main card body 10a there is a diagonal cutout section 5 that has a distinguishing function for preventing the IC card 1 from being inserted incorrectly. Moreover, a concave section 6 is formed on one side of the main card body 10a for securely holding the IC card 1 when it is inserted into an external device, and there is a concave section 7 formed on the other side in which a write-enable/disable switch 8 that sets whether or not to enable writing data to the memory unit M is located such that it can slide freely. This write-enable/disable switch 8 sets whether or not to enable writing data to the memory unit M according to its sliding position, however, this switch is not essential to the embodiments of this invention.

Figure 2:
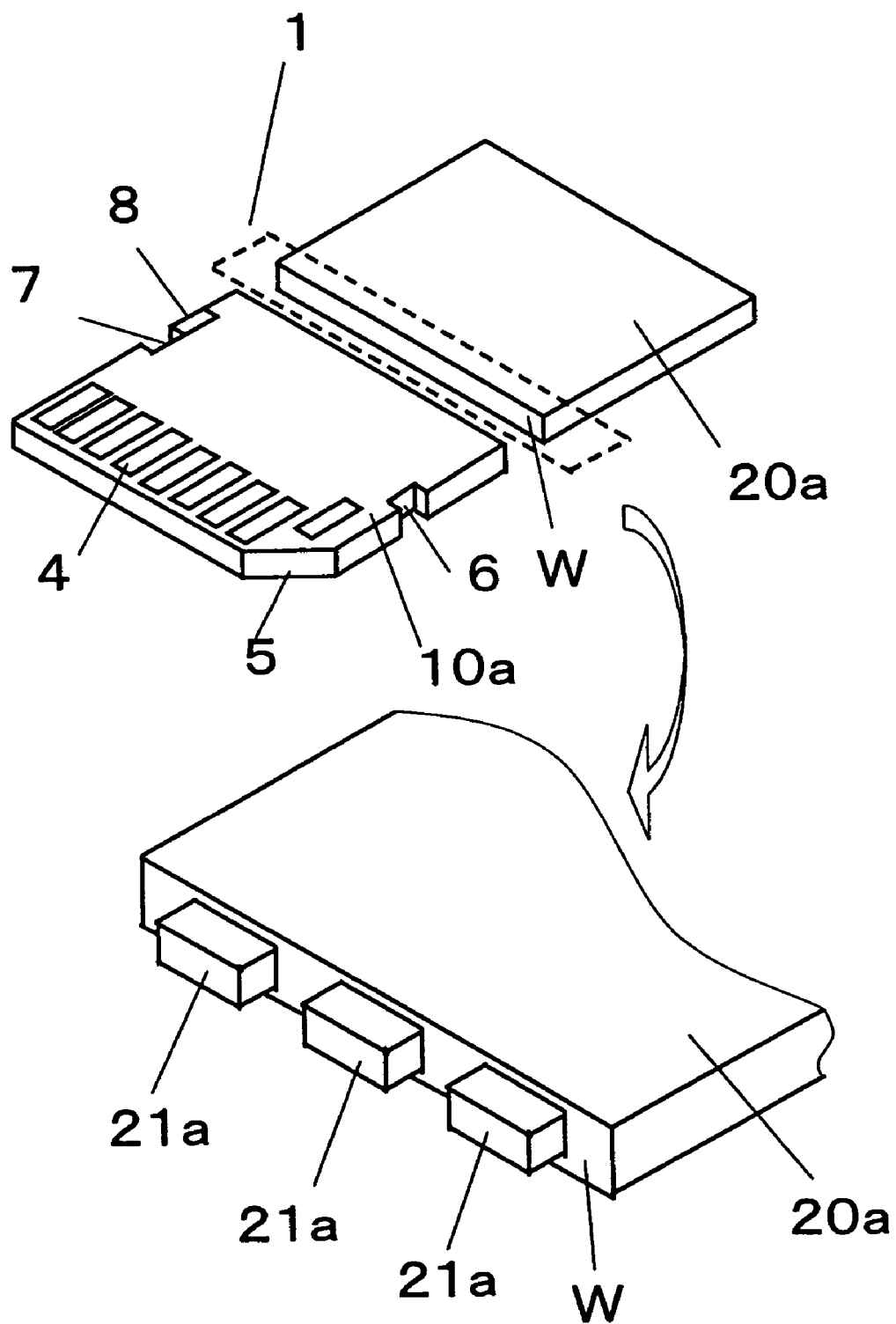
FIG. 2 is an oblique drawing of the main parts of the adapter for an IC card of a first embodiment of the invention.

Also, as shown in FIG. 1, on the edge surface V on the opposite side of the main card body 10a from the side where the contacts 4 are located, there are three concave-shaped main-body-connection contacts 11a, and as shown in FIG. 2, on the edge surface W of the adapter 20a on the side toward the main card body 10a, there are three convex-shaped adapter-connection contacts 21a. The main-body-connection contacts 11a and the adapter-connection contacts 21a are shaped and located such that they fit together. The thickness and relative opposing width of the main card body 10a and adapter 20a are the same, and when the main-body-connection contacts 11a are fitted with the adapter-connection contacts 21a to form a single body, it has a stamp-sized rectangular shape.

Figure 3A:
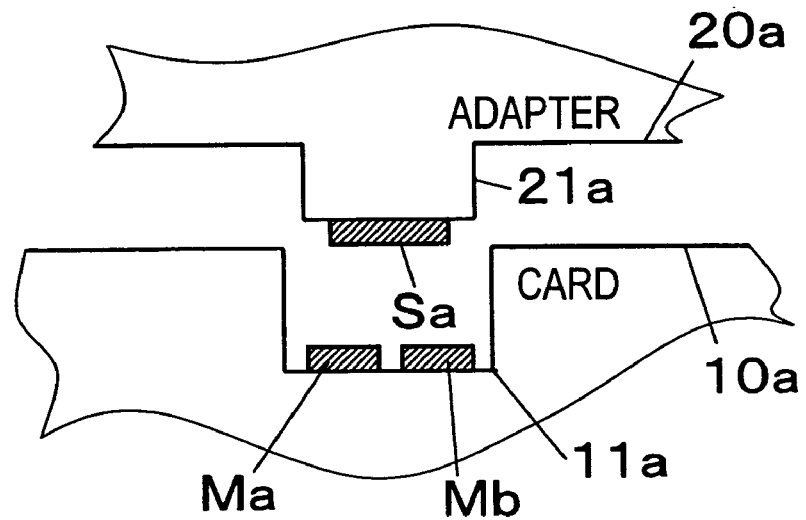
FIGS. 3A and 3B are top views of the connection between the adapter and main card body of an IC card of a first embodiment of the invention.

Also, as shown in FIG. 3A, there are plate shaped contact points Sa located on the end surfaces of the adapter-connection contacts 21a and when the adapter 20a is connected to the main card body 10a, the contact points Sa come in contact with both of the two plate-shaped contact points Ma and Mb located on the end surfaces of the of the main-body-connection contacts 11a to close the contact points.

Figure 3B:
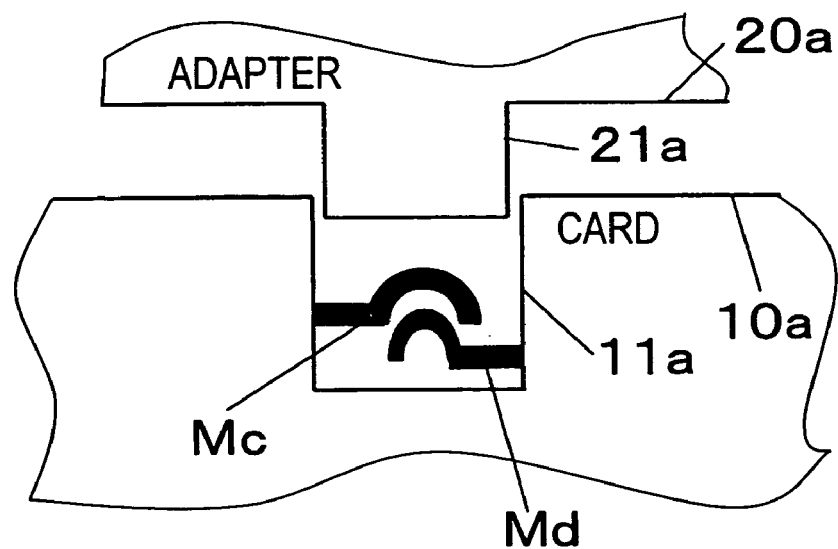

The contacts are not limited to that of a plate-shaped contact as shown in FIG. 3A as long as the contacts are closed when the adapter-connection contacts 21a are fitted together with the main-body-connection contacts 11a. For example, as shown in FIG. 3B, it is also possible to form curved contacts Mc and Md with hook-shaped ends in the concave main-body-connection contact 11a such that when the adapter-connection contact 21a is fitted with the main-body-connection contact 11a the space between both contacts Mc and Md is closed.

In this embodiment, concave-shaped main-body-connection contacts 11a are formed in the main card body 10a and convex-shaped adapter-connection contacts 21a are formed on the adapter 20a, however as long as the contacts can fit together, it is also possible to form convex-shaped main-body-connection contacts 11a in the main card body 10a and concave-shaped adapter-connection contacts 21a on the adapter 20a.

Figure 4:
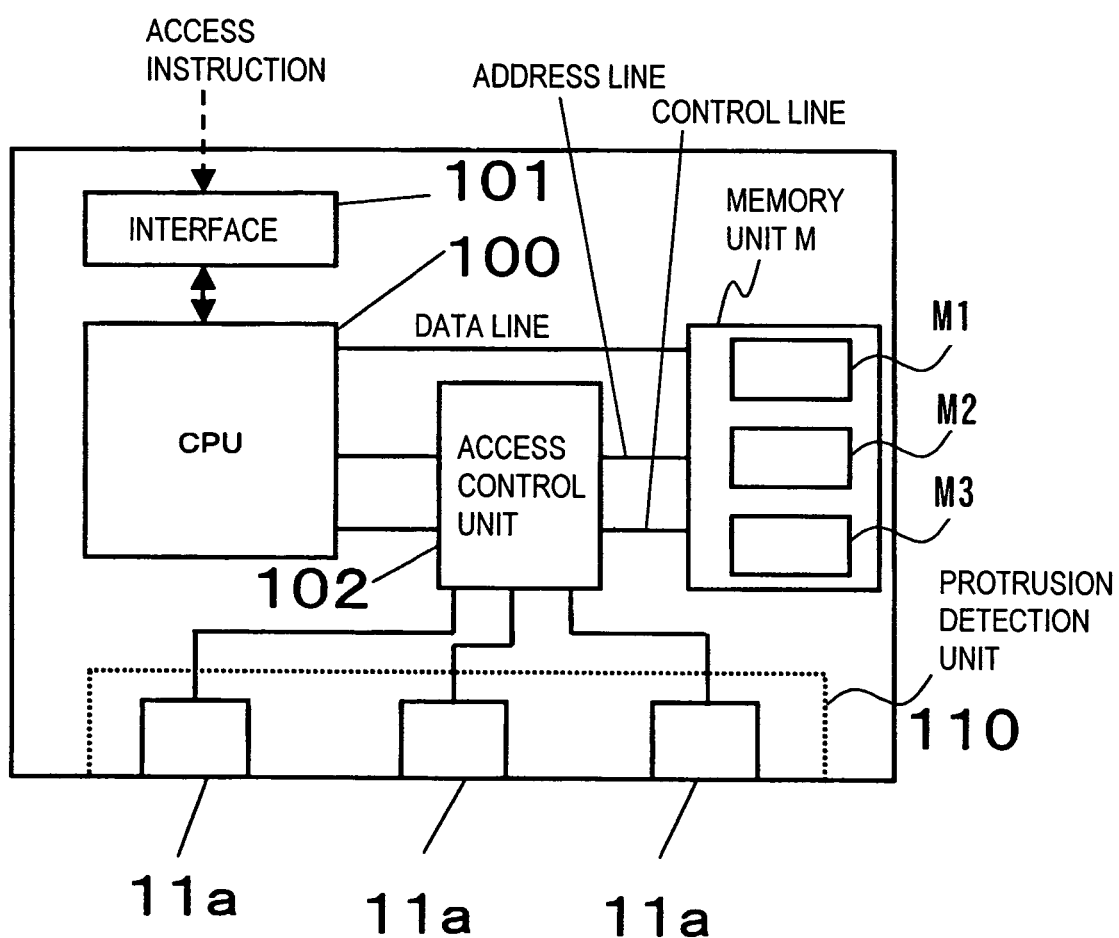
FIG. 4 is a block diagram showing the main electrical construction of an IC card of a first embodiment of the invention.

FIG. 4 shows the electrical construction of the IC card 1 (when the write enable/disable switch 8 is omitted).

On the substrate inside the IC card there is: an interface 101 that receives access instructions from an external device by way of the contacts 4; a CPU 100; a protrusion-detection unit 110 that detects whether or not the convex-shaped adapter-connection contacts 21a are connected; a memory unit M that is operable to record information of applications corresponding to individual services; and an access-control unit 102 that is located on the address line and control line of the data line, address line and control line between the CPU 100 and the memory unit M, and that receives signals from the protrusion-detection unit 110. Programs or data for executing one of applications related to individual services are stored in the memory area M1 to M3 of the memory unit M. When the protrusion-detection unit 110 detects a protrusion, the access-control unit 102 selects an address and control line according to the position of the protrusions detected by the protrusion-detection unit 110, and sets the memory area such that it can be accessed by the CPU 100, and it becomes possible for the CPU 100 to access just the selected memory area. Also, the CPU 100 is only able to receive the detection signal from the protrusion-detection unit 110 for a specified amount of time interval after the main-card-body 10a is connected with an external device by way of the interface 101, and this prevents changing services by removing just the adapter 20a when the main-card-body 10a with attached adapter 20a is connected to an external device. It is also possible for the processing by the access-control unit 102 to be performed by the CPU 100.

Figures 5A, 5B, 5C:
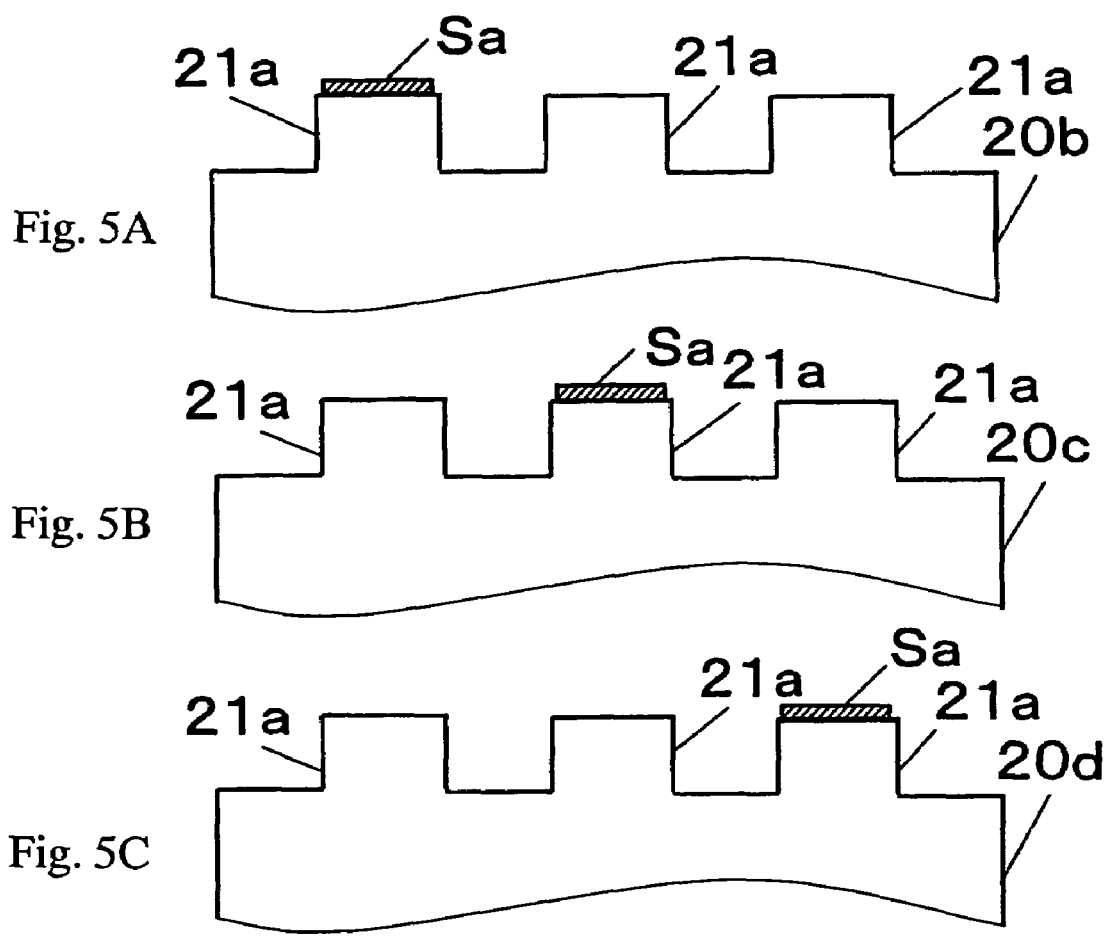
FIGS. 5A, 5B and 5C are top views showing the shape of the connection section of the adapter of an IC card of a first embodiment of the invention.

In the adapter 20b shown in FIG. 5A, there is a contact point Sa formed on only the left contact of the three adapter-connection contacts 21a. When this adapter 20b is connected with the main card body 10a, that left contact fits with the main-body-connection contact 11a of the main card body 10a. In that state, the contact point Sa comes in contact with the contact points Ma and Mb located in that main-body-connection contact 11a. By doing this, a conduction signal is sent to the CPU 100 by way of the access unit 102. Also, processing by the access-control unit 102 sets access such that the CPU 100 can only access the memory area M1. Therefore in this case, when programs related to a credit card for company X, a credit card for company Y and a credit card for company Z are stored in memory area M1, memory area M2 and memory area M3, respectively, the credit card for company X is selected. Also, when programs related to a credit card, cash card and commuter pass are stored in memory area M1, memory area M2 and memory area M3, respectively, the credit card is selected.

Similarly, in the adapter 20c shown in FIG. 5B, there is a contact point Sa formed on only the center contact of the three adapter-connection contacts 21a. When this adapter 20c is connected with the main card body 10a, processing by the access-control unit 102 sets access such that the CPU 100 can only access the memory area M2. Therefore, the credit card for company Y or cash card is selected based on the program related to the credit card for company Y or the cash card stored in the memory area M2.

Also, similarly, in the adapter 20d shown in FIG. 5C, there is a contact point Sa formed on only the right contact of the three adapter-connection contacts 21a. When this adapter 20d is connected with the main card body 10a, processing by the access-control unit 102 sets access such that the CPU 100 can only access the memory area M3. Therefore, the credit card for company Z or commuter pass is selected based on the program related to the credit card for company Z or the commuter pass stored in the memory area M3.

Whether or not to provide a service is set by connecting or not connecting the adapter 20 (20a to 20d) to the main card body 10a in this way, so it is not particularly necessary to have a switch for selecting whether or not to provide a service on the surface of the main card body 10a. Moreover, it is possible to provide a plurality of services according to the type of adapter, so it is not necessary to have a plurality of selection switches on the surface of the main card body 10a. It is possible to select a desired service by properly changing the adapter.

Here, three memory areas were used to correspond to services, however the number is not limited to this.

Second Embodiment

In the first embodiment described above, one service corresponded to one memory area according to the type of adapters 20 (20a to 20d), however, it is also possible to select one service by selecting and combining a plurality of memory areas.

Figure 6A:
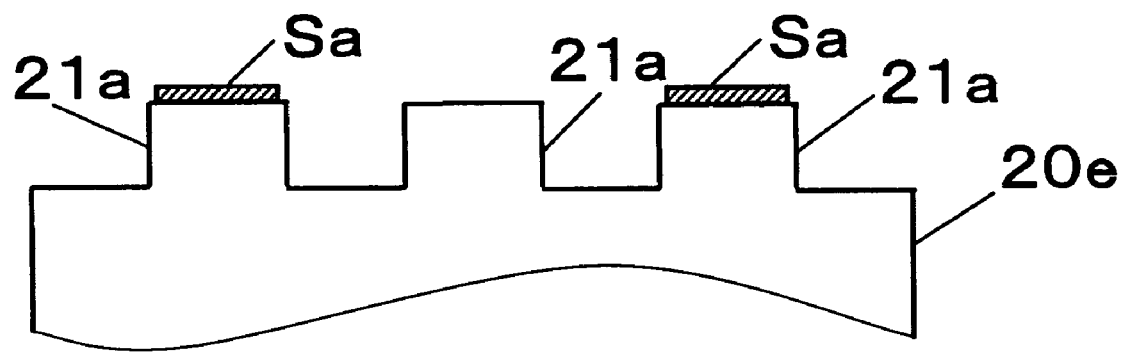
FIGS. 6A and 6B are top views showing the shape of the connection section of the adapter of an IC card of a second embodiment of the invention.
Figure 6B:
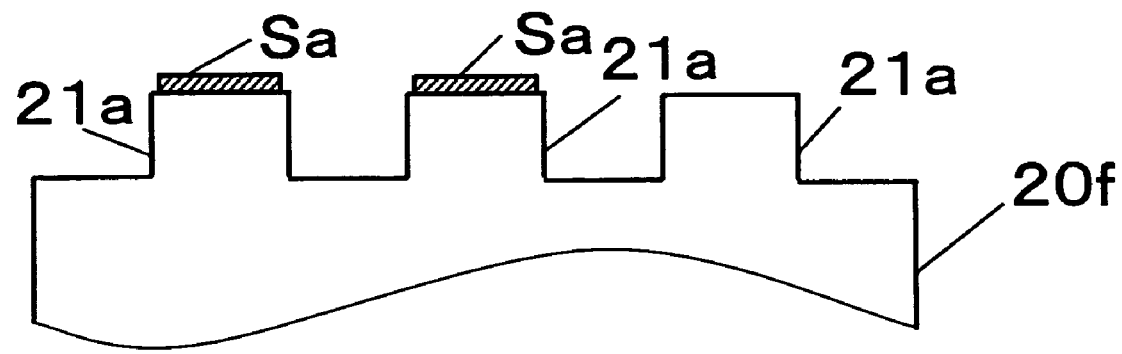

For example, as shown in FIG. 6A, in adapter 20e, contact points Sa are located on the left contact and right contact of three adapter-connection contacts 21a, and when it is connected to the main card body 10, the processing by the access-control unit 102 sets access such that the CPU 100 can access memory area M1 and memory area M3, and by combining memory area M1 and M3, it is possible to provide a new service. Also, as shown in FIG. 6B, in adapter 20f, contact points Sa are located on the middle contact and left contact of the three adapter-connection contacts 21a, and when it is connected to the main card body 10a, the processing by the access-control unit 102 sets access such that the CPU 100 can access memory area M1 and memory area M2, and by combining memory areas M1 and M2, it is possible to provide another new service.

When there are three adapter-connection contacts 21a in this way, the left, center and right contacts with and without contact points can be combined in the following eight ways: 1) no contact point, no contact point, no contact point (this is the same as when the adapter is not connected, however it is stamp size); 2) no contact point, no contact point, contact point (there is a contact point on the right contact); 3) no contact point, contact point, no contact point (there is a contact point on the center contact); 4) no contact point, contact point, contact point; 5) contact point, no contact point, no contact point (there is a contact point on the left contact); 6) contact point, no contact point, contact point, 7) contact point, contact point, no contact point, and 8) contact point, contact point, contact point. Therefore, it is possible to provide seven different services or no service according to combinations of the number and/or location of contact points without using a selection switch.

Figure 7A:
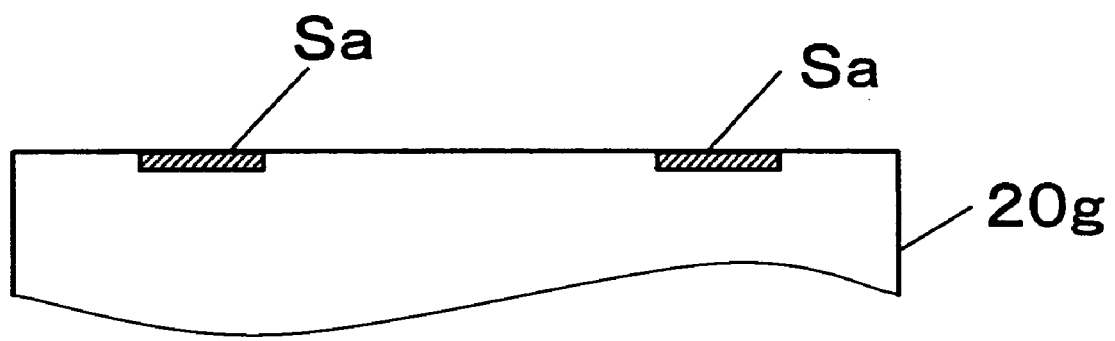
FIGS. 7A and 7B are top views showing another shape of the connection section of the adapter of an IC card of a second embodiment of the invention.
Figure 7B:
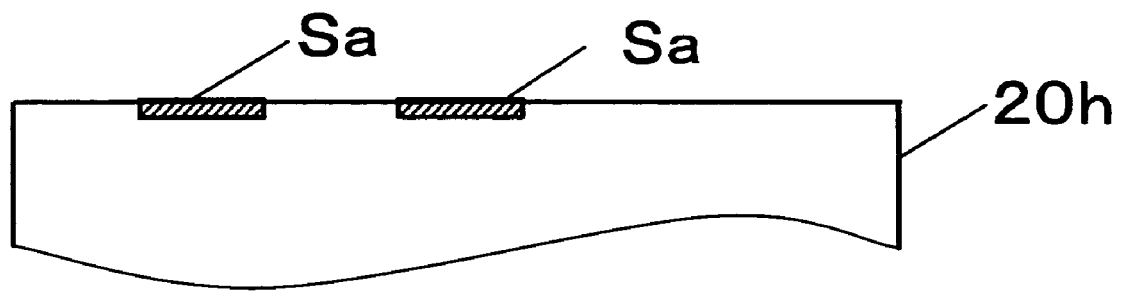
Figure 8:
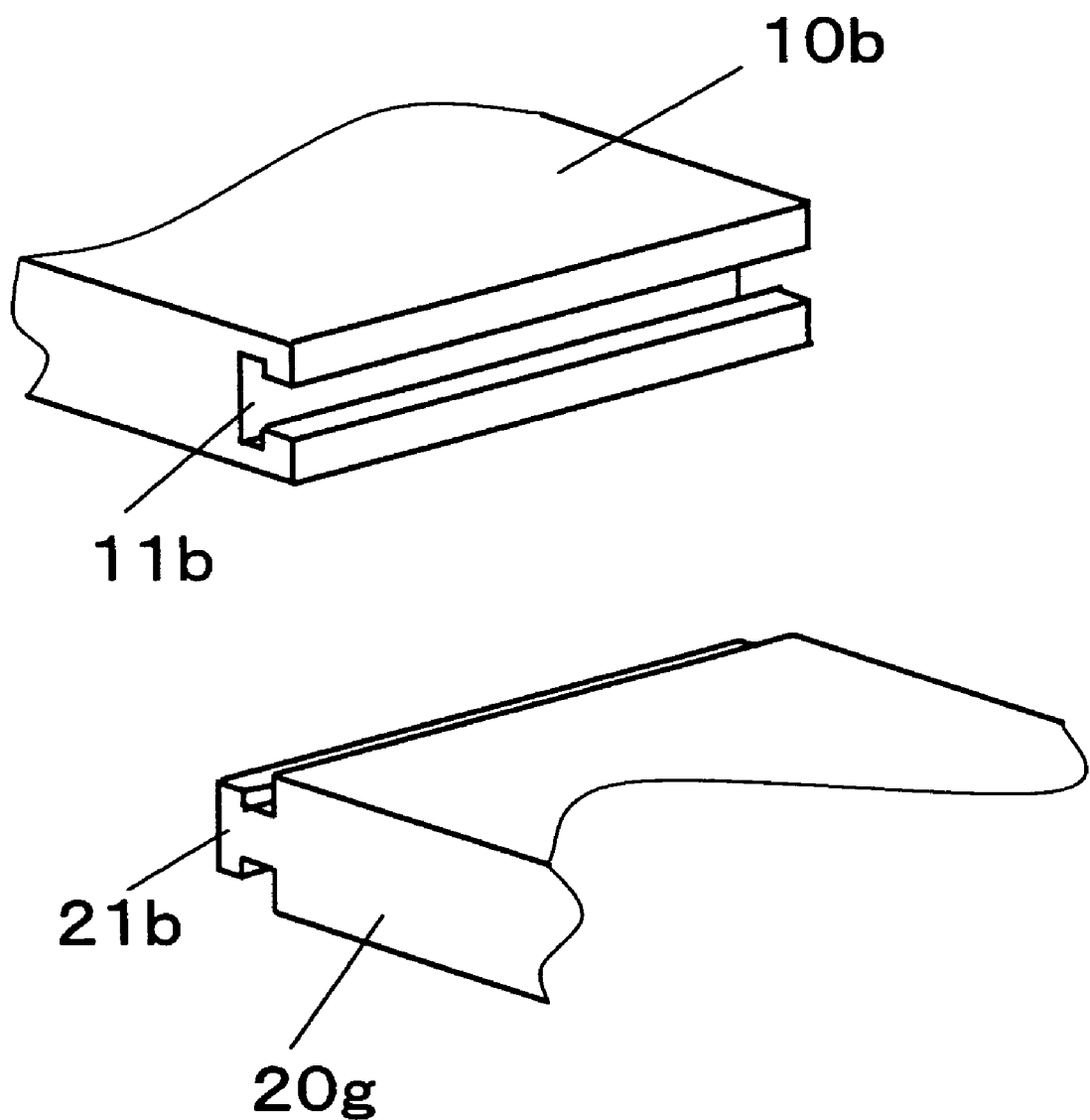
FIG. 8 is an oblique drawing showing the connection between the adapter and main card body of an IC card of a second embodiment of the invention.

As shown in FIGS. 7A and 7B, as the different adapters, it is also possible to embed the contact points Sa in positions on the end surface of the adapters instead of locating them on convex-shaped adapter-connection contacts 21a. The adapter 20g shown in FIG. 7A corresponds to the adapter 20e shown in FIG. 6A. The adapter 20h shown in FIG. 7B corresponds to the adapter 20f shown in FIG. 6B. As shown in FIG. 8, the adapter 20g is fitted with the main card body 10b by inserting the T-shaped protruding head section 21b into the groove section 11b formed in the main card body 10b. The contact points Sa are embedded in the end surface of the head section 21b, and the contact points Ma and Mb are embedded in the groove section 11b.

Figure 9A:
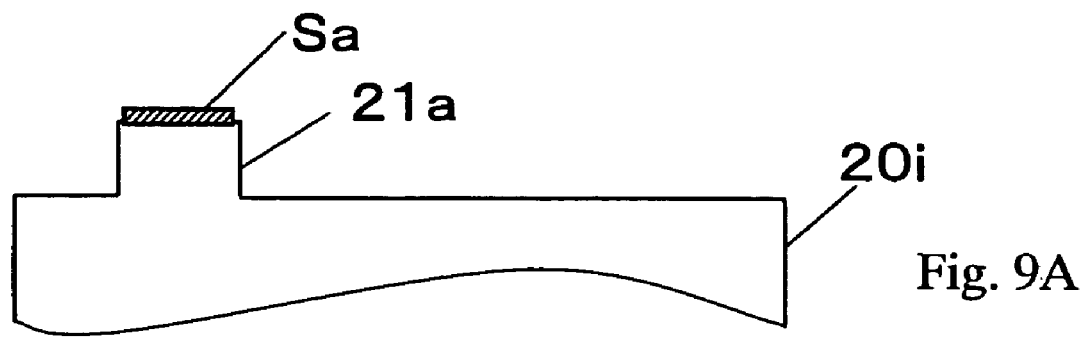
FIGS. 9A, 9B and 9C are top views showing another shape of the connection section of the adapter of an IC card of a second embodiment of the invention.
Figure 9B:
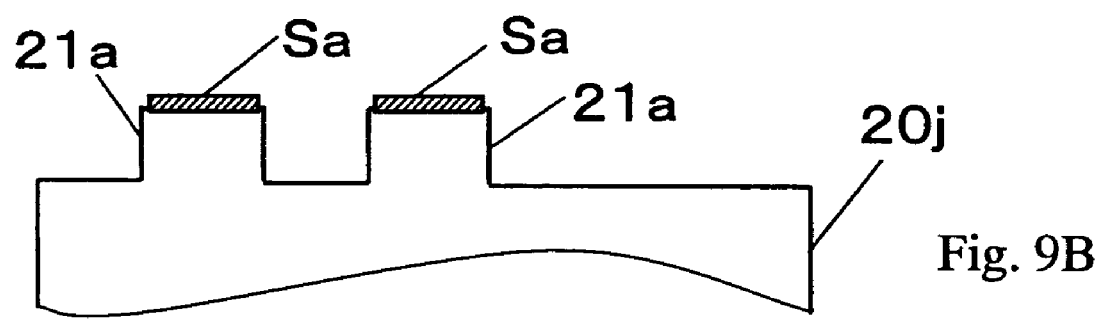
Figure 9C:
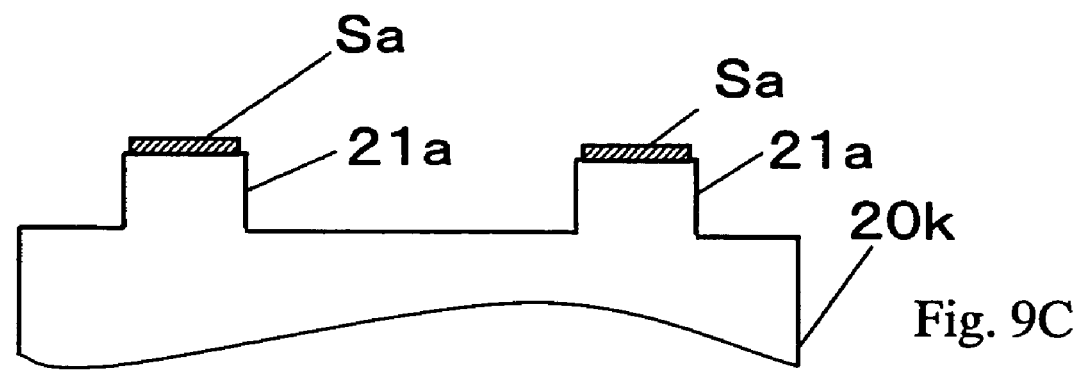

Also, as shown in FIGS. 9A, 9B and 9C, instead of having different numbers and locations of contact points, it is possible to make different kinds of adapters by the number and position of convex-shaped adapter-connection contacts 21a having contact points Sa. In this case, the number of adapter-connection contacts 21a is no more than the number of concave-shaped main-body-connection contacts 11a. For example, as shown in FIG. 1, when there are three main-body connection contacts 11a, it is possible to prepare seven kinds of adapters: one adapter-connection contact 21a located on the left side of adapter 20i as shown in FIG. 9A, two adapter-connection contacts 21a located on left side and center of adapter 20j as shown in FIG. 9B, and two adapter-connection contacts 21a located on the left side and right side of adapter 20k, as well as an adapter with contacts 21a on the left side, center and right side, an adapter with a contact 21a only in the center, an adapter with contacts 21a in the center and on the right side, and an adapter with a contact 21a only on the right side; and provide seven different services. Furthermore, it is also possible to prepare a plurality of different adapters by changing just the number or just the position of the adapter-connection contacts 21a.

Figure 10A:
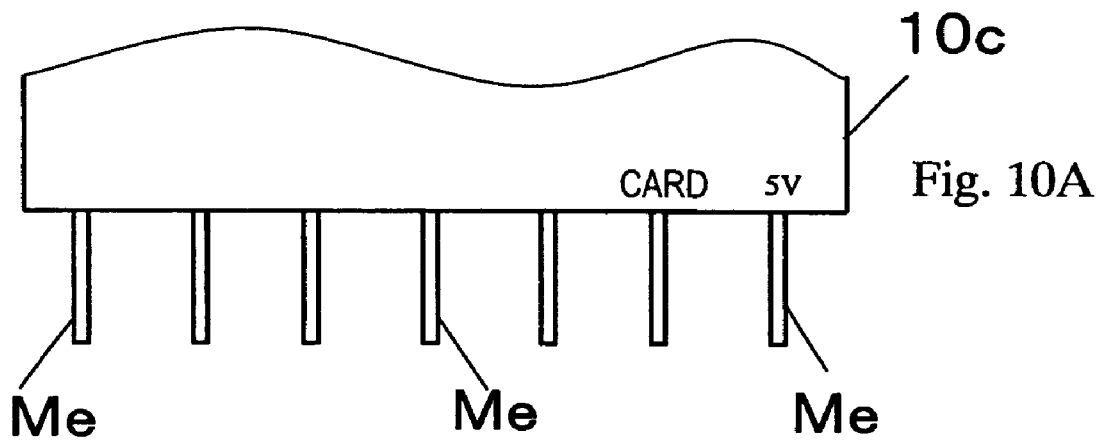
FIGS. 10A, 10B and 10C are top views showing another connection between the adapter and main card body of an IC card of a second embodiment of the invention.
Figure 10B:
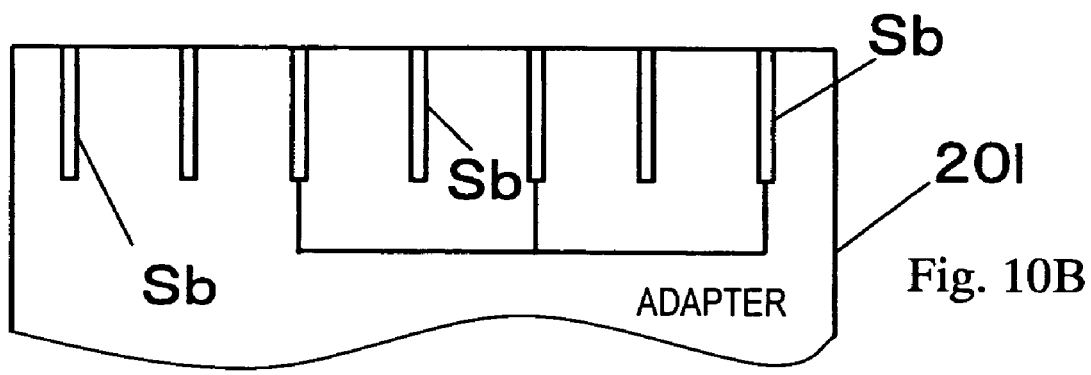
Figure 10C:
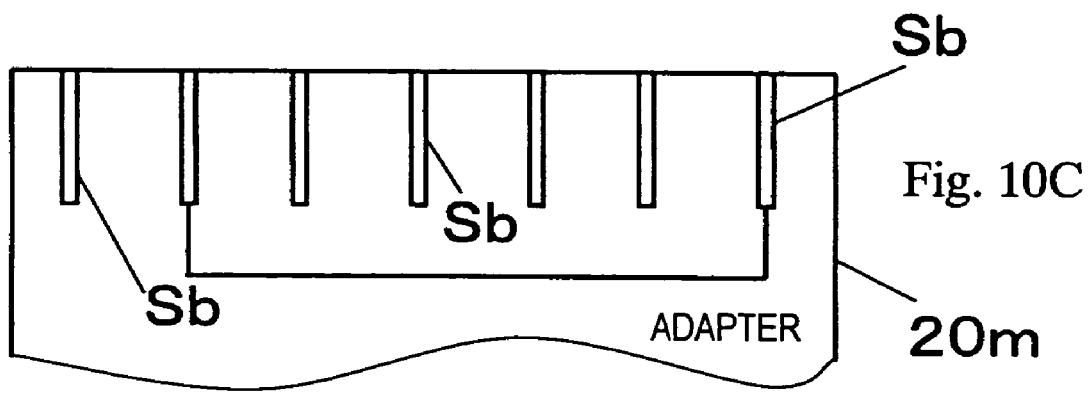

Also, as shown in FIG. 10A, in case of a plurality of pin-shaped contacts Me (here 7 pins are used) protruding from the end surface of the main card body 10c, concave-shaped contact points Sb can be formed on the end surface of the adapter 20l, 20m, as shown in FIGS. 10B and 10C, such that they can fit with the respective contact points Me. In this case, part or all of the contact points Sb on the adapter side are connected inside the adapter to each other to complete a circuit. The adapter type differs depending on the contact points Sb on the adapter side that are connected in the circuit. In the example shown in FIG. 10B, starting from the top right of the figure, the first, third and fifth contact points Sb are connected to each other in the circuit. In the example shown in FIG. 10C, starting from the right, the first and sixth contact points Sb are connected to each other in the circuit. The main card body 10c can electrically determine the adapter type by checking the conduction with each of the contact points Sb of the adapter connected to itself. By differing the number and/or location of the connected contact points Sb in this way, it is possible to prepare a plurality of adapter types and provide a plurality of services.

Third Embodiment

Figure 11A:
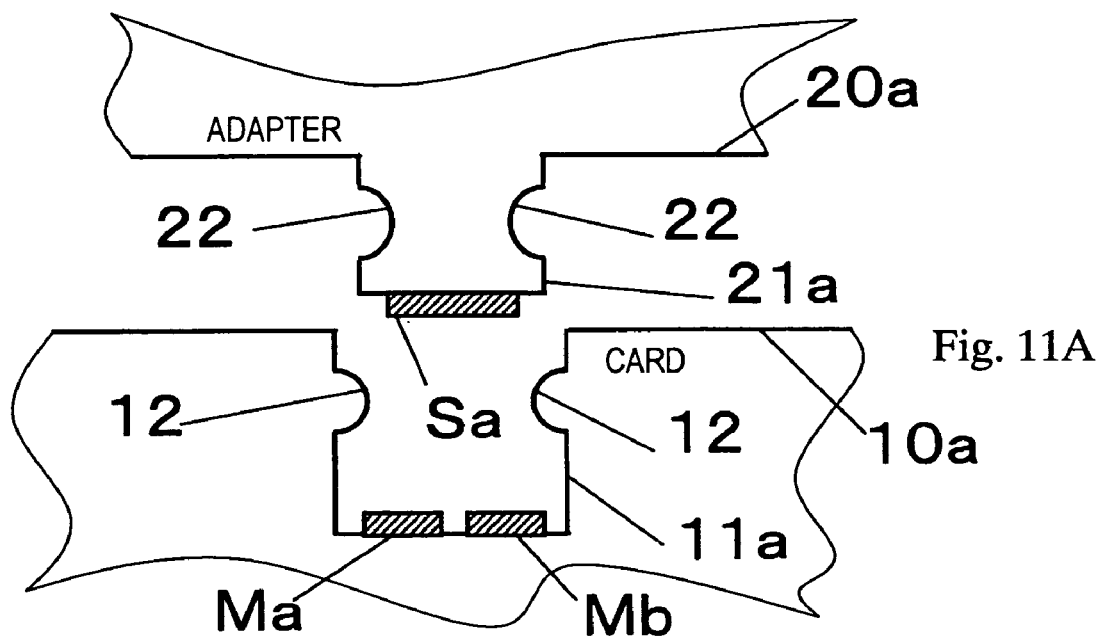
FIGS. 11A and 11B are top views showing the connection between the adapter and main card body of an IC card of a third embodiment of the invention.

In the first embodiment described above, rectangular-shaped protruding convex adapter-connection contacts 21a were formed on the end surface of the adapter 20a, and concave main-body-connection contacts 11a shaped such that they fit with the adapter-connection contacts 21a were formed on the main card body 10a, however, as shown in FIG. 11A, it is possible to improve the fit between the adapter-connection contacts 21a and the main-body-connection contacts 11a by forming small holes 22 on both side surfaces of the adapter-connection contacts 21a and forming small protrusions 12 on both side surfaces of the main-body-connection contacts 11a that are shaped such that they can fit with the small holes 22.

Figure 11B:
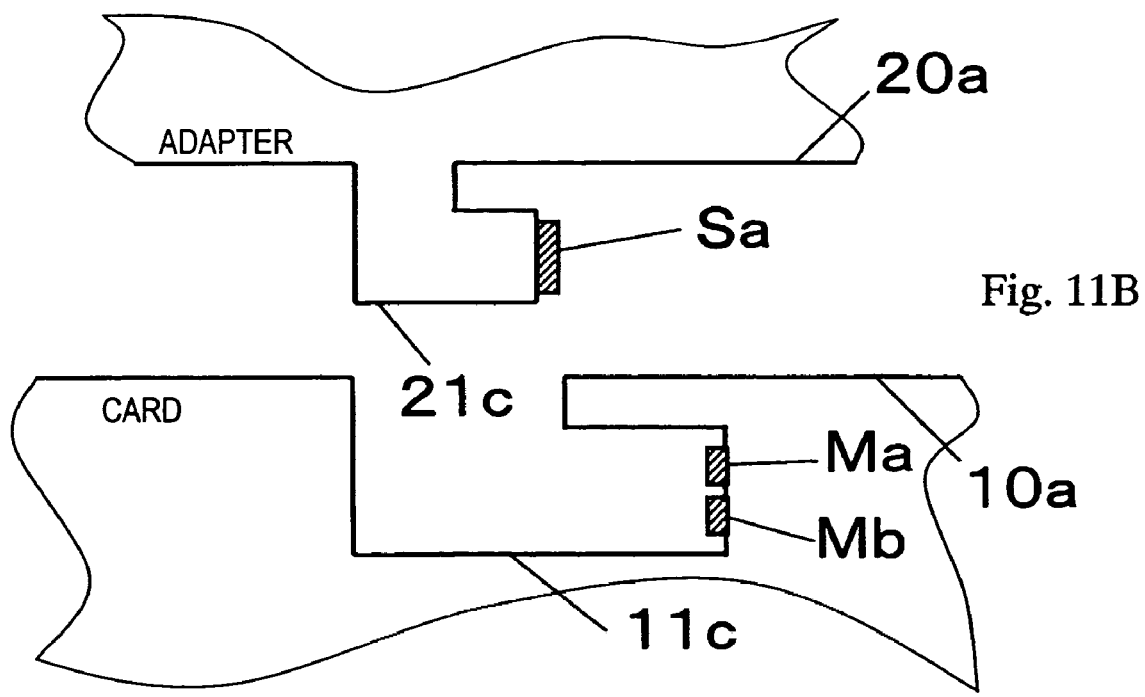

Also, as shown in FIG. 11B, it is possible to improve the fit between the adapter-connection contacts 21c and the main-body-connection contacts 11c by forming L-shaped protruding adapter-connection contacts 21c on the end surface of the adapter 20a, and forming L-shaped concave main-body-connection contacts 11c on the main card body 10a such that they can fit with the adapter-connection contacts 21c. The adapter-connection contacts 21c are fitted with the main-body connection contacts 11c by moving the adapter-connection contacts 21c in the vertical direction (downward in FIG. 11) and inserting them into the main-body-connection contacts 11c, and then sliding them in the horizontal direction (toward the right in FIG. 11) such that the contact points Sa formed on the tip ends of the adapter-connection contacts 21c come in contact with the contact points Ma and Mb located on the far side of the main-body-connection contacts 11c.

Fourth Embodiment

When the adapters 20 (20a to 20m) are connected with the main card bodies 10 (10a to 10c) as in the first through third embodiments described above, it is difficult for the user to see the adapter-connection contacts. When it is not possible for the user to distinguish the adapter type, it is not possible for the user to know what service is being provided.

Therefore as shown in FIG. 12, it is desirable that the outer appearance of the adapters 20n to 20q be shaped to correspond to the service provided. By doing so, it is possible for the user to instantly and easily recognize the provided service or what service is currently being provided.

Figure 12A:
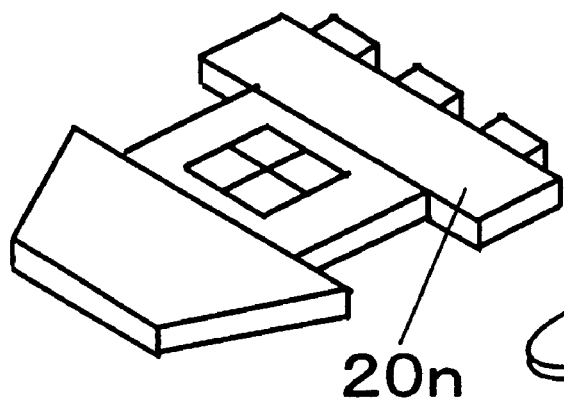
FIGS. 12A, 12B, 12C and 12D are oblique drawings showing the external shape of adapters for an IC card of a fourth embodiment of the invention.
Figure 12B:
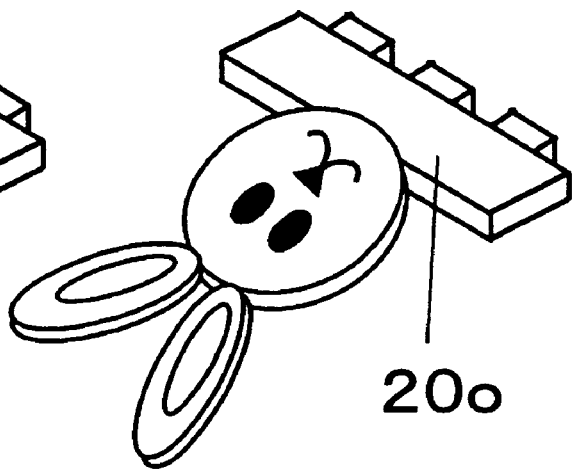
Figure 12C:
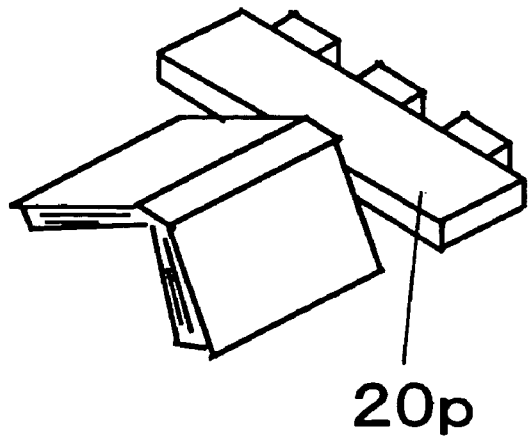
Figure 12D:
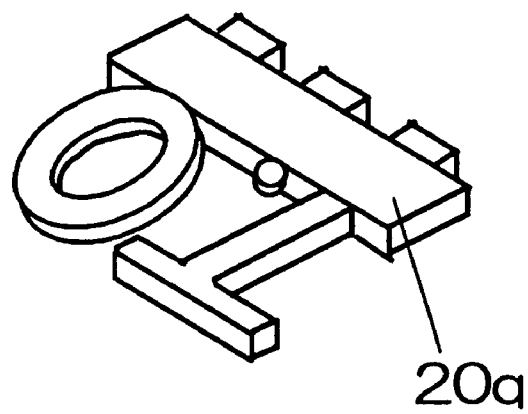

For example, in the case of the adapter 20n shown in FIG. 12A, a contact point Sa is located only on the left adapter-connection contact 21a, and the service of a mail tool, for example, is assigned as the service provided. In the case of the adapter 20o shown in FIG. 12B, contact points Sa are located on the left and center adapter-connection contacts 21a, and the service of an animal-photo application, for example, is assigned as the service provided. In the case of the adapter 20p shown in FIG. 12C, contact points Sa are located on the left and right adapter-connection contacts 21a, and the service of reading application, for example, is assigned as the service provided. In the case of the adapter 20q shown in FIG. 12D, contact points Sa are located on the center and right adapter-connection contacts 21a, and a special with initials 'T.O.', for example, is assigned as the service provided.

For example, the external appearance of the adapters 20n to 20q could be the shape of registered trademarks, and by corresponding the shapes with the positions of the contact points Sa of the adapter-connection contacts 21a, it is possible to easily recognize from the outside what service the card provides.

Fifth Embodiment

Figure 13:
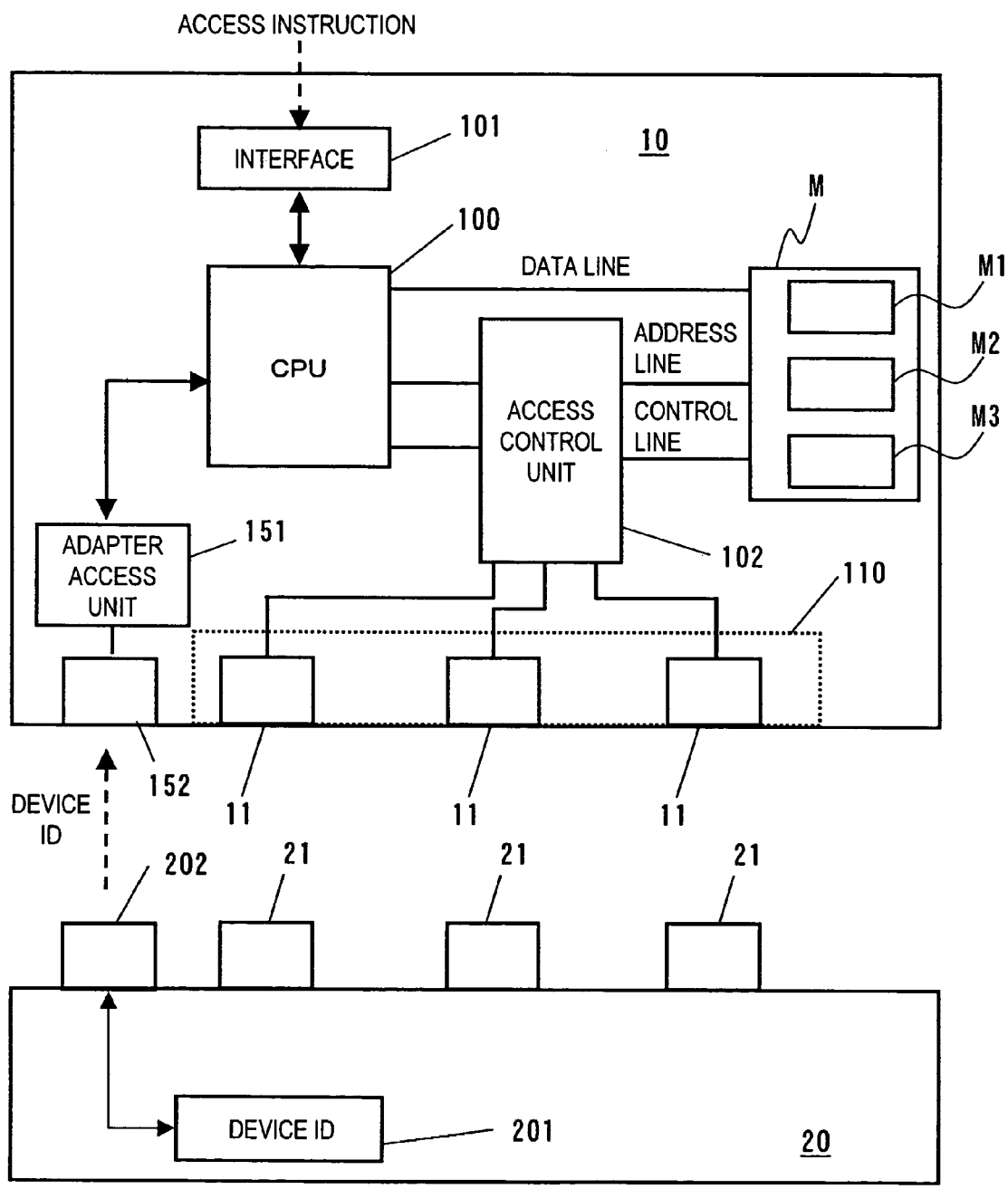
FIG. 13 is a drawing for explaining the electrical construction of an IC card of a fifth embodiment of the invention.

The adapter 20 is not only used for physically selecting a service as in the embodiment described above, but can also be used for other purposes. For example, by storing various kinds of information on the adapter, the CPU 100 on the main card body 10 can use that information for managing the services provided. In this embodiment, as shown in FIG. 13, there is a memory 201 in the adapter 20 for storing device ID that uniquely identifies an external device. The device ID that is stored in this memory 201 is acquired in advance from the external device, and can be the ID of the user's own personal-information contact, for example. By performing an instruction on a personal digital assistant when the user obtains a new main card body 10 and/or adapter 20, the main card body 10 follows the instruction and acquires the device ID information from that personal digital assistant and stores it in the memory of the adapter 20.

As shown in FIG. 13, there is an adapter-access unit 151 in the main card body 10 for accessing this memory 201. The adapter-access unit 151 is connected to the memory 201 via a main card body contact 152 and contact 202 on the adapter side. The adapter-access unit 151 only writes the device ID input from the CPU 100 to the memory 201 when the device ID is not stored in the memory 201. Also, according to a request from the CPU 100 it reads the device ID from the memory 201 and outputs the read device ID to the CPU 100.

When the IC card 1 is inserted into the card slot of the personal digital assistant, the CPU 100 acquires the device ID from that personal digital assistant and adapter 20, and compares the acquired device IDs. When both of the device IDs match, the CPU 100 determines that the IC card can be used on that personal digital assistant, and uses the adapter 20 to provide the selected service to that personal digital assistant. On the other hand, when the two device IDs are different, the CPU 100 determines that the IC card 1 cannot be used on that personal digital assistant, and even though a service is physically selected using the adapter 20, it does not provide that service to that personal digital assistant. In other words, a software lock is unlocked only when both of the device IDs match, and the user is then able to use the service on that personal digital assistant. When both of the device IDs match normally means that the owner of the external device and owner of the IC card that is connected to that external device match. Therefore, even when the IC card is lost, it is possible to prevent improper use by a third party.

Figure 14A:
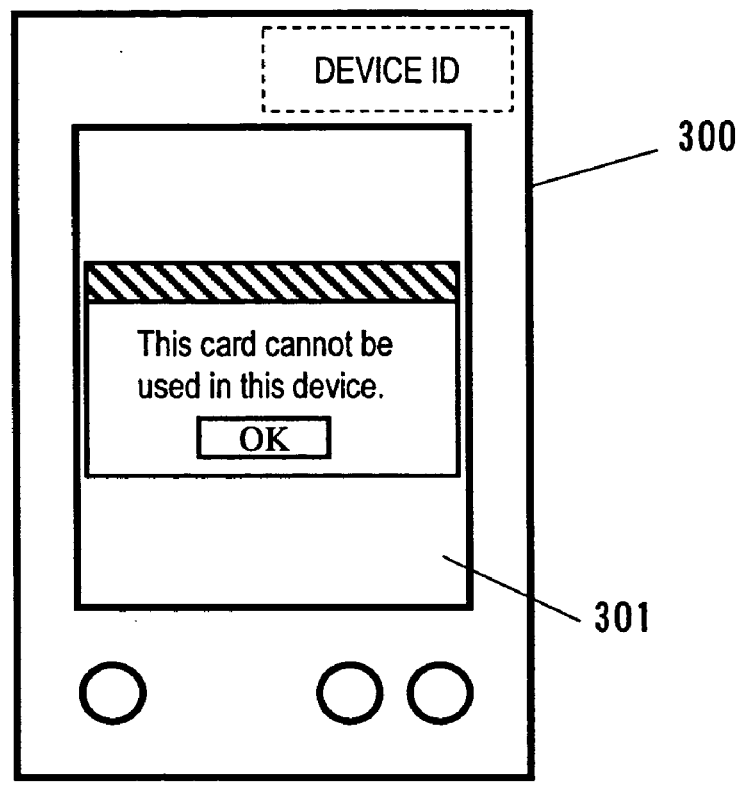
FIGS. 14A and 14B are drawings showing display examples of messages on an external device of a fifth embodiment of the invention.
Figure 14B:
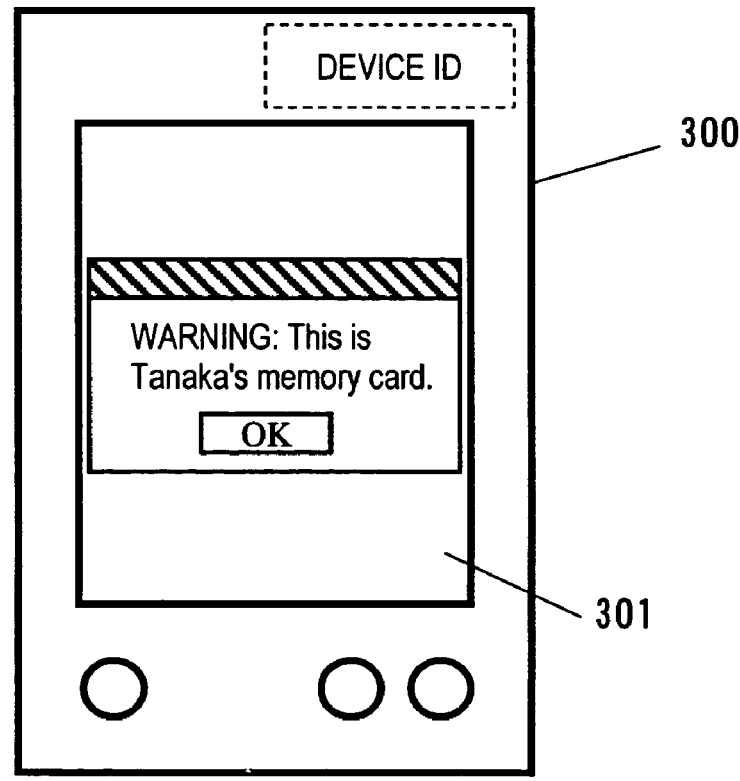

As shown in FIG. 14A, for example, when the two device IDs are different, it is possible to display a message on the display 301 of the personal digital assistant 300 indicating that the IC card 1 cannot be used in that external device, or indicating that the service cannot be used. Also, by storing information in the memory 201 that indicates the owner of the IC card 1, it is possible to display the name of the owner of that IC card on the display 301, as shown in FIG. 14B, and execute a warning.

Also, in the case where providing the service is prohibited before a warning message notifying of the owner, proper user, range of authorized use, or the like has been checked, it is possible to allow that the service be provided after that message has been checked. After the warning message has been displayed and that message has been checked, it is also possible to prevent use by anyone other than an authorized user. Moreover, in addition to displaying a warning message, it is also possible to sound a warning alarm, or to cause the display to flash.

Furthermore, even when both of the device IDs are different, if authorization was given beforehand to access specific information or to use a specific service, then the message as described above may be not displayed regarding access to that information or use of that service.

When the adapter 20 is not connected to the main card body 10 that is mounted in the external device, it is possible to display a message on the external device indicating that the adapter 20 is not connected.

Also, it is possible for the CPU 100 to use an encoding key that is stored in the main card body 10 to encode the device ID that is written in the memory 201. When the encoded device ID is read from the memory 201, a decoding key that corresponds to the encoding key is used to restore that device ID. It is possible for the external device to compare the device IDs, however, in the IC card, a tamper-register module or the like is used, and strict security by the stored information is performed, so it is easy to prevent improper use.

Sixth Embodiment

In the fifth embodiment described above, the device ID for the external device was stored in the adapter 20, however, instead of that, or in addition to that, it is also possible to store a card ID that uniquely identifies the IC card in the memory 201 of the adapter 20. This card ID is acquired from the main card body 10 when the user obtains a new adapter 20, for example.

Figure 15:
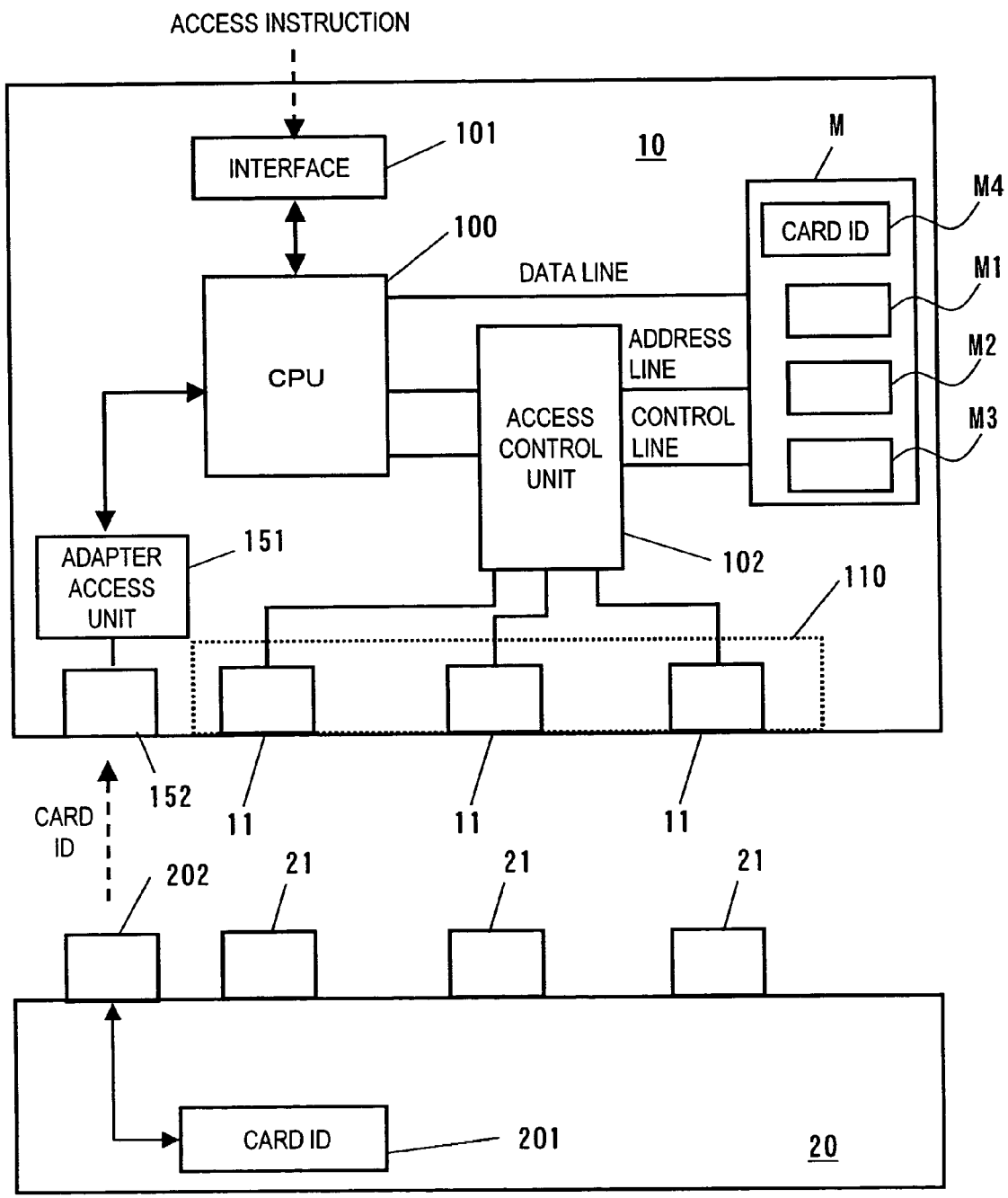
FIG. 15 is a drawing for explaining the electrical construction of an IC card of a sixth embodiment of the invention.

As shown in FIG. 15, there is a memory area M4 in the main card body 10 for storing the card ID of that card. According to an instruction from the external device, the CPU 100 reads the card ID from that memory area M4, and outputs the card ID to the adapter-access unit 151. The adapter-access unit 151 writes the card ID obtained from the CPU 100 to the memory 201 only when the card ID is not stored in the memory 201, for example. Also, according to a request from the CPU 100, the adapter-access unit 151 reads the card ID from the memory 201 and outputs the read card ID to the CPU 100.

After the IC card 1 has been inserted into the card slot of the external device, the CPU 100 acquires the card IDs from the memory area M4 and the adapter 20, and compares the acquired card IDs. When both card IDs match, the CPU 100 determines that the adapter 20 can be used and provides the service selected using the adapter 20 to that external device. On the other hand, when the two card IDs are different, the CPU 100 determines that that adapter 20 cannot be used, and even though a service is physically selected using the adapter, that service is not provided to the external device. In other words, a software lock is unlocked only when both card IDs match, and the user is able to use the service with the external device. Therefore, it is possible to prevent improper user of the adapter 20, even if the adapter becomes lost. For example, as a benefit for purchasing a concert ticket, a special service is provided to a purchaser that allows them to view special video contents, and an adapter that corresponds to that service is distributed to purchasers. In this kind of case, by storing the card ID of the purchaser's card in that adapter, it is possible to prevent viewing of that video in the case when someone other than the person to whom the adapter was distributed improperly obtains that adapter.

Figure 16:
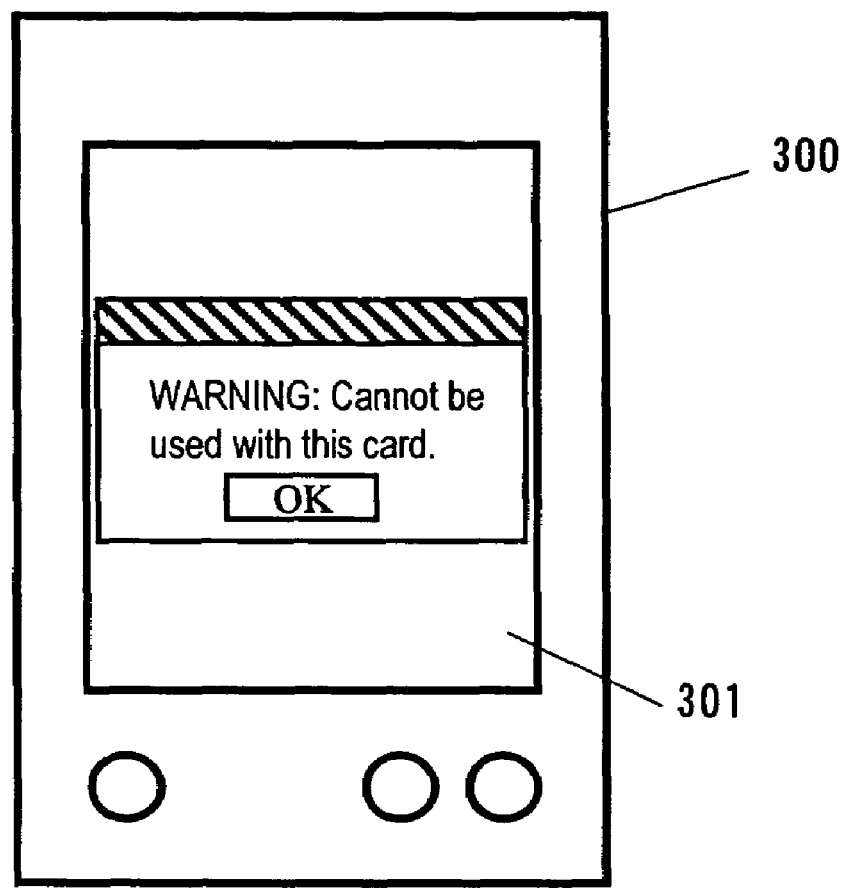
FIG. 16 is a drawing showing a display example of a message on an external device of a sixth embodiment of the invention.

As shown in FIG. 16, in the case where the two card IDs are different, it is possible to display a message indicating that the adapter cannot be used by that card. Furthermore, it is also possible to perform a warning as in the fifth embodiment.

Seventh Embodiment

Figure 17:
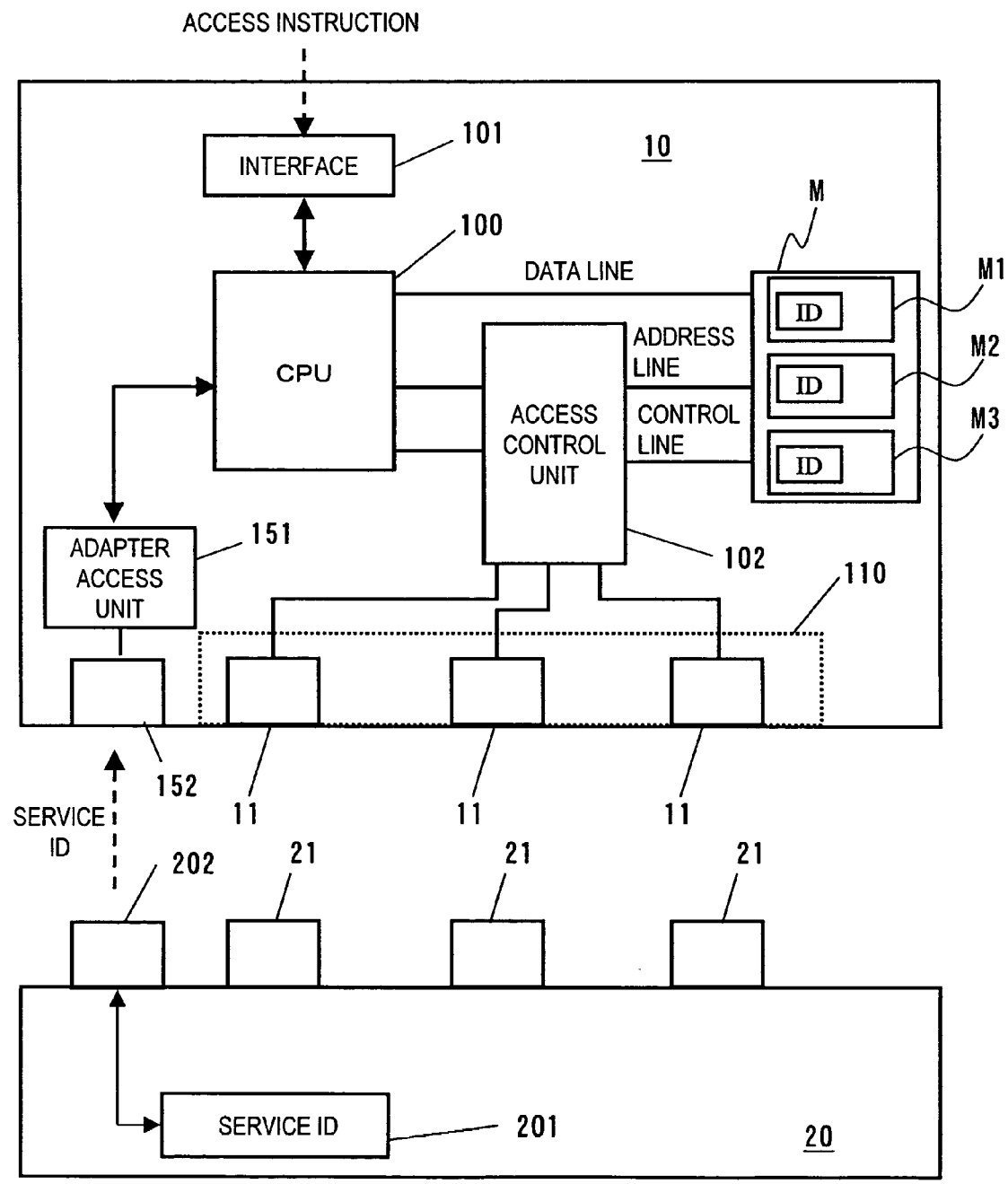
FIG. 17 is a drawing for explaining the electrical construction of an IC card of a seventh embodiment of the invention.

Instead of or in addition to storing the device ID and/or card ID in the adapter 20 as explained in the fifth and sixth embodiment, it is also possible to store a service ID in the memory 201 of the adapter 20 that uniquely identifies the service. This service ID is written beforehand at the time of manufacture or the time of shipping of the adapter. As shown in FIG. 17, it is possible to basically use the same electrical construction for the main card body 10 as was used in the fifth embodiment. In this embodiment, service IDs are respectively stored in corresponding memory areas M1 to M3. The service IDs are stored in the memory areas when the services are downloaded to the main card body 10 for example. According to a request from the CPU 100, the adapter-access unit 151 of the main card body 10 reads the service ID from the memory 201 and outputs it to the CPU 100.

After the IC card 1 is inserted into the card slot of the external device, the CPU 100 acquires the service ID from the memory area corresponding to the service that is physically selected using the adapter 20. Also, the CPU 100 compares the service ID acquired from the adapter 20 with the service ID acquired from the memory area. When both service IDs match, the CPU 100 determines that the physical selection is valid, and provides the selected service to the external device. However, when the two service IDs are different, the CPU 100 determines that the physical selected is invalid, and does not provide the selected service to the external device. In other words, only when both service IDs match does the selection become valid in regards to software, and the user is able to use the selected service on the external device. Therefore, it is possible to prevent improper use of the service by using a counterfeit adapter, even when the main card body 10 is lost.

Figure 18:
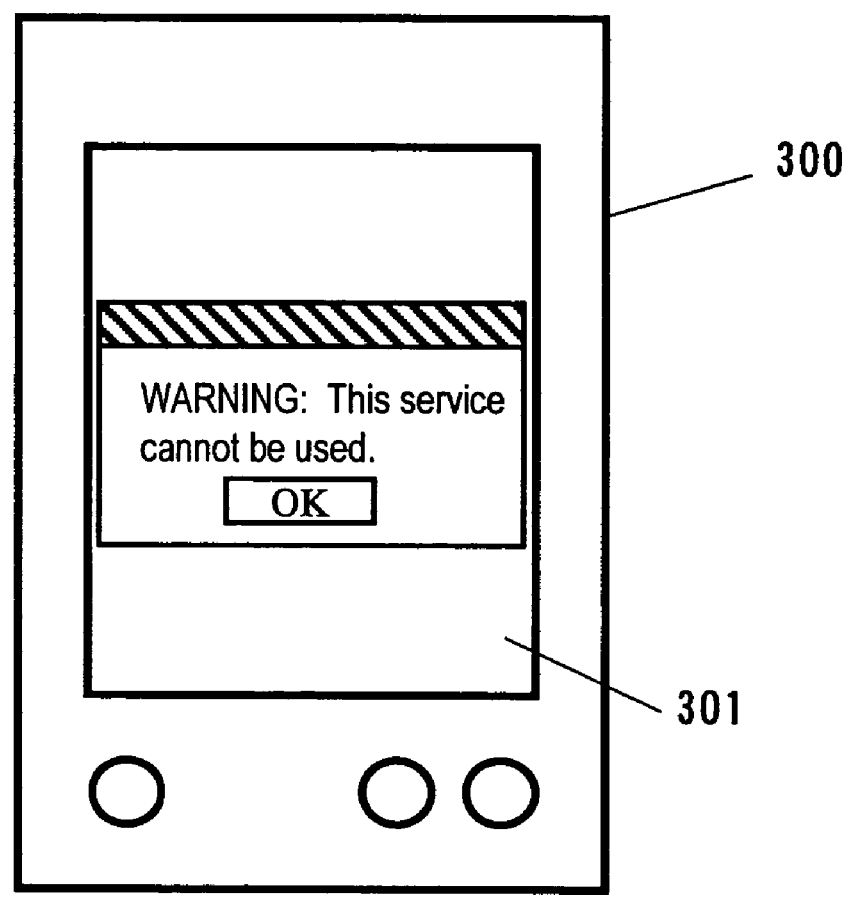
FIG. 18 is a drawing showing a display example of a message on an external device of a seventh embodiment of the invention.

As shown in FIG. 18, in the case when the two service IDs are different, it is possible to display a message indicating that the service cannot be used. Furthermore, as in the fifth embodiment, it is also possible to perform a warning.

It is also possible to further prevent improper use by managing the service provided by combining the device ID, card ID and service ID.

Moreover, in the fifth through the seventh embodiments, the device ID, card ID and service ID were stored in the memory 201, however, it is not limited to that and it is possible to place an IC tag in the adapter 20 and to store those IDs on an IC chip of that IC tag.

Eighth Embodiment

Figure 19:
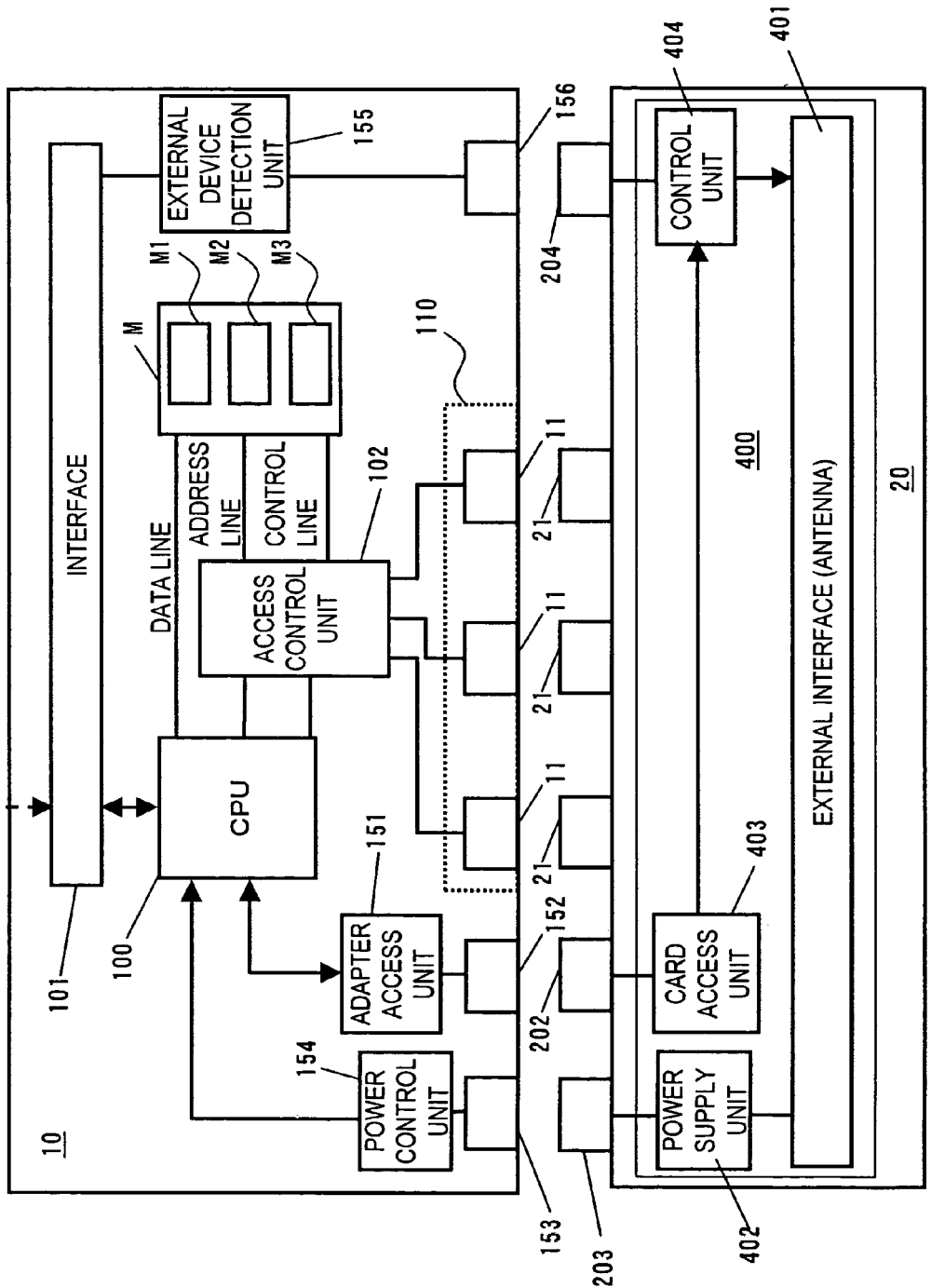
FIG. 19 is a drawing for explaining the electrical construction of an IC card of an eighth embodiment of the invention.

As shown in FIG. 19, in this embodiment, there is a RFIC tag 400 in the adapter 20. This RFIC tag 400 is used for sending service related information to the external device. The RFIC tag 400 comprises an external interface 401 for performing wireless communication with the external device. This external interface 401 includes an antenna and a modem circuit.

When a signal is received from an external device having a wireless interface corresponding to the antenna, the power-supply unit 402 takes the power from that signal and drives the circuits of the RFIC tag 400 with that power. Furthermore, the power-supply unit 402 supplies power to the main card body 10 connected to the adapter 20 by way of the contact 203 on the adapter and the contact 153 on the main card body 10. When the main card body 10 is not connected to an external device, the power control unit 154 of the main card body 10 drives the circuits of the main card body 10 such as the CPU 100 with the power supplied from the adapter 20, and performs power-saving control.

Also, when power is supplied from the power-supply unit 402, the card-access unit 403 of the adapter 20 sends a transfer request to transfer service-related information to the CPU 100 via the contact 202 on the adapter 20 and contact 152 on the main card body 10. After receiving this request, the CPU 100 acquires service information from the memory area corresponding to the service selected using the adapter, for example. This service information is the name of the service and an explanation of the contents of the service. The service information acquired by the CPU 100 is supplied to the card-access unit 403. After that service information has been supplied, the card-access unit 403 sends that information to the external interface 401.

Figure 20:
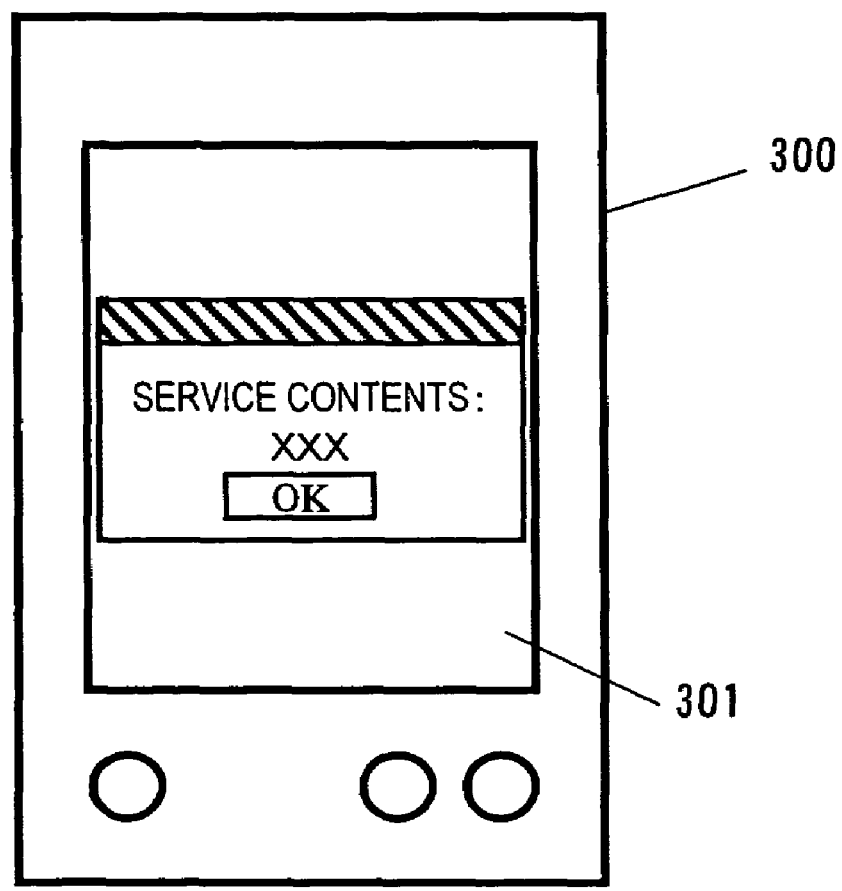
FIG. 20 is a drawing showing a display example of a message on an external device of an eighth embodiment of the invention.

When the external device receives the service information that is sent, it is possible to display that service information on the display 301 of the external device 300, as shown in FIG. 20, even when the IC card is not connected to the external device. In the example shown in FIG. 20, the contents of the service are displayed. The user can reference this display to easily know what service is selected.

Here, instead of the sending information about the selected service, it is possible to send information about all of the services that the CPU 100 can provide.

When the IC card 1 is connected to the external device, there is direct communication between the main card body 10 and the external device by way of the interface 101, so there becomes less of a need to perform direct communication between the adapter 20 and the external device. Also, by intercepting wireless communication while the IC card 1 is connected to the external device it is possible for a third party to learn which service is being provided to the external device.

In this embodiment, in order to avoid unnecessary leakage of the contents of the service provided, the main card body 10 has an external-device-detection unit 155. This external-device-detection unit 155 detects whether or not the main card body 10 is connected to an external device, and outputs the detection result to a control unit 404 in the adapter 20 via the contact 156 on the main card body 10 and the contact 204 on the adapter 20.

When it is detected that the main card body 10 is connected to the external device, the control unit 404 stops sending service related information from the external interface 401. Service information is not sent while the IC card is connected to the external device even when there is a request from the external device.

The user is able to easily know the service contents when the IC card is not connected to the external device, and there is no fear of the service contents leaking unnecessarily when the IC card is connected to the external device.

Figure 21:
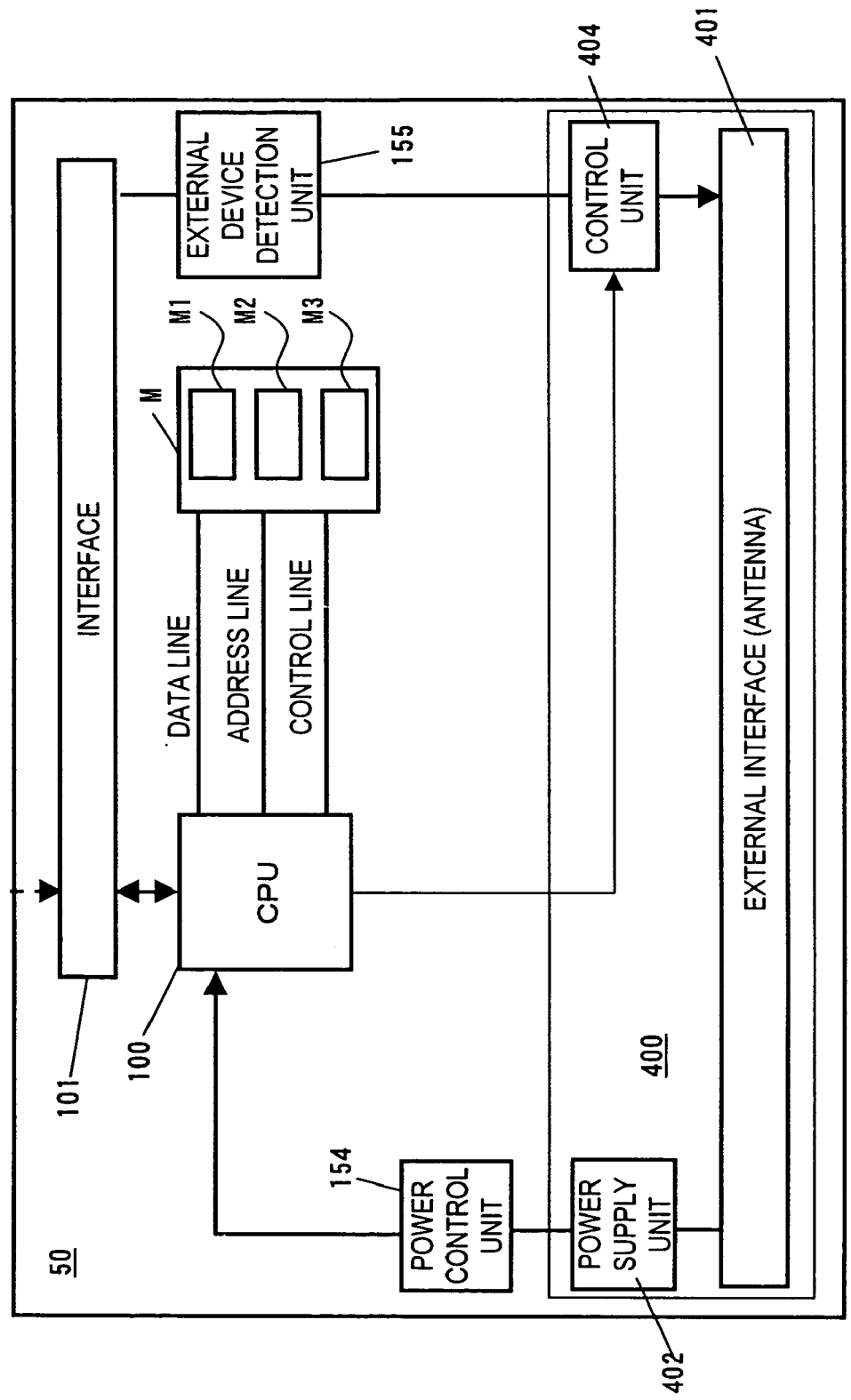
FIG. 21 is a drawing for explaining the electrical construction of a memory card of an eighth embodiment of the invention.

In this embodiment, the RFIC tag 400 is located in the adapter 20, however, it is also possible to locate the RFIC tag in the main card body 10 or memory card. As shown in FIG. 21, the electrical construction of the memory card 50 having an RFIC tag 400 is basically the same as the construction of the main card body 10 described above. By sending information related to the service and data provided from the main card body 10 and memory card from the RFIC tag 400, it is possible for the user to easily know the contents of the service and data.

It is also possible to use other means besides a RFIC tag as a way to send service information. For example, the shape of a contact-less IC card can be formed to be the same as that of the adapter described above. By doing so, that contact-less IC card can be used as the adapter, and the communication interface of the contact-less IC card can be used for sending service information.

Ninth Embodiment

Figure 22:
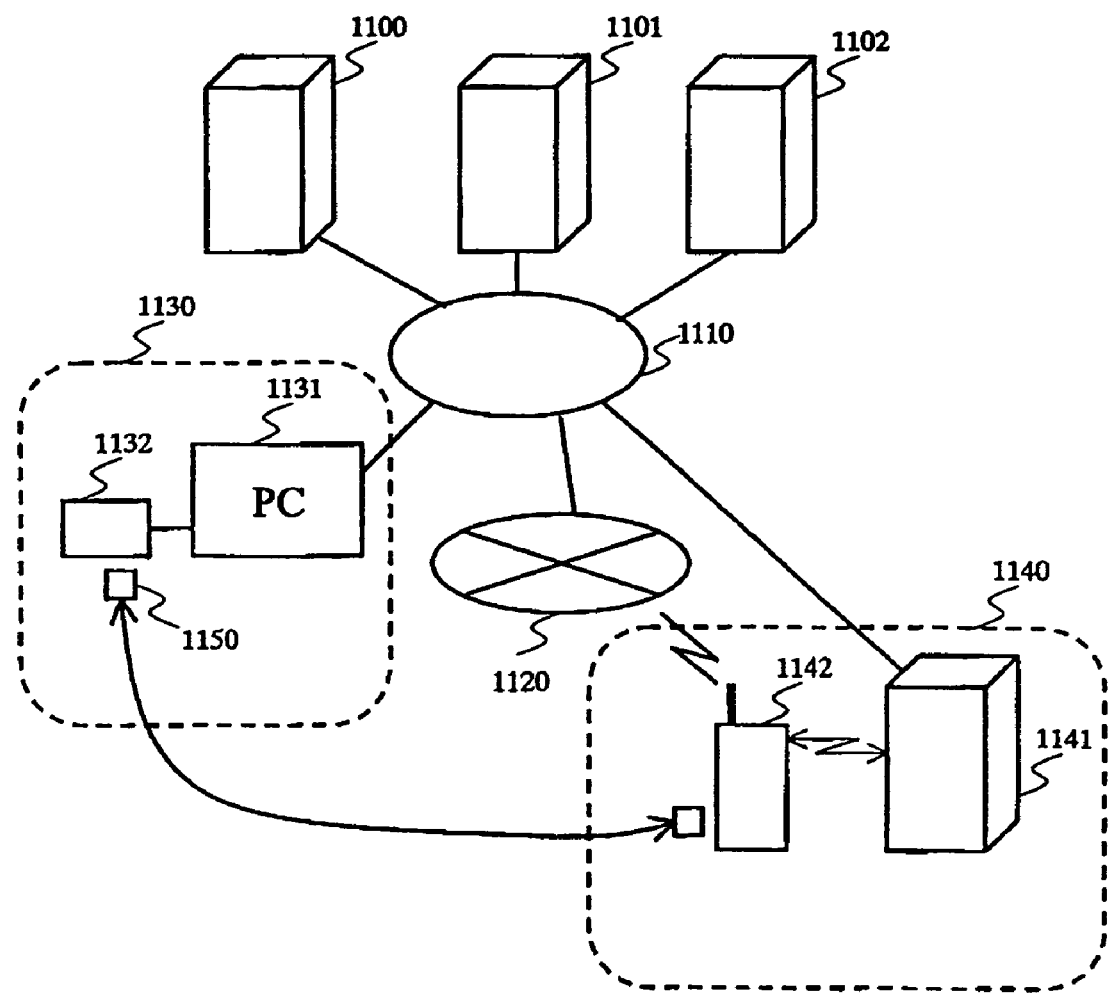
FIG. 22 is a schematic diagram for the case when the IC card of this invention is used in another device.

Next, using FIG. 22 as a reference, an example of a user using a device in which the aforementioned IC card 1 (here the number 1150 is given) can be used, will be given.

Here, a ticket server 1100, credit server 1101 and credit server 1102 are connected to the Internet 1110, and the servers respectively provide a sales service for selling concert tickets, settlement service for credit company X and settlement service for credit company Y.

The user wants to reserve a concert ticket using the IC card 1150. Here, the user first inserts the IC card 1150 into a cardholder 1132 that is connected to a personal computer 1131 in the user's home 1130. Before inserting the IC card 1150, the user can select the company from which to receive the credit service by connecting the corresponding adapter to the main card body.

Next, the user connects to the ticket server 1100, reserves the desired concert ticket and purchases an electronic ticket. Settlement for payment of the ticket can be processed beforehand by a company whose credit service is received and which corresponds to the adapter connected to the IC card 1150.

In this way, the user downloads the concert ticket data from the ticket server onto the IC card 1150, and the bill for payment of the ticket is sent to a credit company that has been preset on the IC card 1150 and the payment is processed by that credit server 1101.

Next, the situation of using the concert ticket purchased by the user loaded onto the IC card 1150 as is with the portable telephone 1142 will be considered. When using the concert ticket at a different location, the ticket data can be kept safe since it is stored on the user's IC card 1150. This is because when the ticket data is stored on a server connected to a network, it is under the threat of hacking or the like.

Next, in order for the user to enter the concert hall 1140, the purchased concert ticket is verified using the portable telephone 1142. Ticket verification at the concert hall 1140 can be performed by using a ticket reader 1141 that exchanges data with the portable telephone 1142 using short-distance wireless communication.

Furthermore, when the user desires to change the type of ticket at the concert hall, payment of the cost difference can be processed by using the credit server 1102, for example, over a public network 1120 from the portable telephone 1142.

Here, a personal computer 1131 and cardholder 1132 were used at home 1130 for reserving a concert ticket, however it is also possible to use an electronic-commerce function using a portable telephone 1142. In that case, not only can the user reserve the concert ticket at home 1130 but also from a mobile location.

Also, here a portable telephone 1142 was used for verifying the concert ticket at the concert hall 1140, however, it is possible to perform the same processing by inserting just the IC card 1150 into the cardholder (not shown in the figure) of the ticket reader 1141.

As was explained above, by using a device that is capable of using the IC card described above, it is possible for the user to receive various services from one IC card in a mobile environment.

With the memory card of this invention, the service to be provided from the card is selected using an adapter so it is not necessary to locate switches on the outside of the card, and this memory card can be applied to an IC card that comprises a CPU or LSI and a semiconductor memory and that is capable of providing a plurality of services on one card.

What is claimed is:

1. A memory card capable of executing one of a plurality of applications corresponding to individual services, the memory card comprising:
an adapter that designates one of the services;
a main card body to which the adapter is removably connected;
an interface for an external device;
a memory unit operable to store information of the plurality of applications;
a detection unit operable to detect whether or not the adapter is connected to the main card body; and a CPU or LSI that, by selecting one application from among the plurality of the applications based on a detection signal from the detection unit, provides the service designated by the adapter to the external device by way of the interface, wherein a service ID that uniquely identifies a service is stored in the adapter and the memory unit, and the CPU or LSI acquires and compares the service IDs from the adapter and the memory unit, and when the service IDs match, provides a service to the external device.

2. The memory card of claim 1 wherein the adapter has concave-shaped or convex-shaped adapter-connection contacts, and the main card unit has convex-shaped or concave-shaped main-body-connection contacts that fit with the concave-shaped or convex-shaped adapter-connection contacts; and wherein the detection unit sends a conduction signal to the CPU or LSI by closing contact points between the adapter-connection contacts and main-body-connection contacts, when the adapter is connected to the main card body.

3. The memory card of claim 2 wherein small protrusions or small holes are formed on side surfaces of the adapter-connection contacts and sections shaped so as to fit with the small protrusions or small holes are formed on the main-body-connection contacts.

4. The memory card of claim 2 wherein the adapter-connection contacts are convex shaped and the number of contacts is no more than the number of convex-shaped main-body-connection contacts; and wherein information of a service corresponding to the number or position or a combination of both the number and position of the adapter-connection contacts is stored in the memory unit, in order to designate the service according to the number or position or a combination of both the number and position of the adapter-connection contacts.

5. The memory card of claim 2 wherein there is a combination of one or two or more adapter-connection contacts with some having the contact point and some not having the contact point; and wherein information of a service corresponding to the combination of adapter-connection contacts with and without the contact point is stored in the memory unit, in order to designate the service according to the combination of adapter-connection contacts with and without contacts.

6. A memory card capable of executing one of a plurality of applications corresponding to individual services, the memory card comprising:

an adapter that designates one of the services;

a main card body to which the adapter is removably connected;

an interface for an external device;

a memory unit operable to store information of the plurality of applications;

a detection unit operable to detect whether or not the adapter is connected to the main card body; and a CPU or LSI that, by selecting one application from among the plurality of the applications based on a detection signal from the detection unit, provides the service designated by the adapter to the external device by way of the interface, wherein a card ID that uniquely identifies a memory card is stored in the adapter and the memory unit, and the CPU or LSI acquires and compares the card IDs from the adapter and the memory unit, and when the card IDs match, provides a service to an external device.

7. The memory card of claim 6 wherein the adapter has concave-shaped or convex-shaped adapter-connection contacts, and the main card unit has convex-shaped or concave-shaped main-body-connection contacts that fit with the concave-shaped or convex-shaped adapter-connection contacts; and wherein the detection unit sends a conduction signal to the CPU or LSI by closing contact points between the adapter-connection contacts and main-body-connection contacts, when the adapter is connected to the main card body.

8. The memory card of claim 7 wherein small protrusions or small holes are formed on side surfaces of the adapter-connection contacts and sections shaped so as to fit with the small protrusions or small holes are formed on the main-body-connection contacts.

9. The memory card of claim 7 wherein the adapter-connection contacts are convex shaped and the number of contacts is no more than the number of convex-shaped main-body-connection contacts; and wherein information of a service corresponding to the number or position or a combination of both the number and position of the adapter-connection contacts is stored in the memory unit, in order to designate the service according to the number or position or a combination of both the number and position of the adapter-connection contacts.

10. The memory card of claim 7 wherein there is a combination of one or two or more adapter-connection contacts with some having the contact point and some not having the contact point; and wherein information of a service corresponding to the combination of adapter-connection contacts with and without the contact point is stored in the memory unit, in order to designate the service according to the combination of adapter-connection contacts with and without contacts.

11. A memory card capable of executing one of a plurality of applications corresponding to individual services, the memory card comprising:

an adapter that designates one of the services;

a main card body to which the adapter is removably connected;

an interface for an external device;

a memory unit operable to store information of the plurality of applications;

a detection unit operable to detect whether or not the adapter is connected to the main card body; and a CPU or LSI that, by selecting one application from among the plurality of the applications based on a detection signal from the detection unit, provides the service designated by the adapter to the external device by way of the interface, wherein the adapter comprises an IC tag that sends information of a service, the main card body comprises an external-device-detection unit operable to detect whether or not the card is connected to an external device, and the adapter comprises a control unit operable to stop the information of the service from being sent from the IC tag when the adapter was detected on the main card body that the card is connected to the external device.

* * * * *